US012667521B2

(12) United States Patent
Lennon et al.

(10) Patent No.: US 12,667,521 B2
(45) Date of Patent: Jun. 30, 2026

(54) METHODS AND ADAPTERS FOR MIXING PHARMACEUTICAL COMPLEXES

(71) Applicant: West Pharmaceutical Services, Inc., Exton, PA (US)

(72) Inventors: Dan Lennon, Kildare (IE); Emer Moloney, Kildare (IE); Aidan Byrne, Dublin (IE); Martin McGarry, Dublin (IE); Patrick Dowling, Dublin (IE); Michael J. Sullivan, Birdsboro, PA (US); Rajiv Kumar, Exton, PA (US); Md Abu Hasan, Exton, PA (US); Jorge Santos, Fountain Hills, AZ (US)

(73) Assignee: West Pharmaceuticals Services, Inc., Exton, PA (US)

( * ) Notice: Subject to any disclaimer, the term of this patent is extended or adjusted under 35 U.S.C. 154(b) by 366 days.

(21) Appl. No.: 18/376,389

(22) Filed: Oct. 3, 2023

(65) Prior Publication Data

US 2024/0108547 A1 Apr. 4, 2024

Related U.S. Application Data

(60) Provisional application No. 63/378,230, filed on Oct. 3, 2022.

(51) Int. Cl.
*A61J 1/20* (2006.01)
*B01L 3/00* (2006.01)

(52) U.S. Cl.
CPC ........... *A61J 1/2096* (2013.01); *A61J 1/2058* (2015.05); *B01L 3/502746* (2013.01);
(Continued)

(58) Field of Classification Search
CPC .................. A61J 1/2058; A61J 1/2096; A61M 2039/1077; B05C 17/00506;
(Continued)

(56) References Cited

U.S. PATENT DOCUMENTS

| | | | |
|---|---|---|---|
| 3,927,868 | A | 12/1975 | Moore |
| 3,989,434 | A | 11/1976 | Mercer |

(Continued)

FOREIGN PATENT DOCUMENTS

| | | | |
|---|---|---|---|
| CN | 206103829 | U | 4/2017 |
| EP | 1392436 | A1 | 3/2004 |

(Continued)

OTHER PUBLICATIONS

International Search Report and Written Opinion for International Application No. PCT/US2023/075873, dated Jun. 6, 2024, 18 Pages.

(Continued)

*Primary Examiner* — Kai H Weng
(74) *Attorney, Agent, or Firm* — Blank Rome LLP

(57) ABSTRACT

Embodiments of an adapter, a system including the adapter, and methods of using the adapter may be for mixing a first substance and a second substance. The adapter may include a body having a first port configured to connect with a first container to receive a first substance, a second port configured to connect with a second container to receive a second substance, a third port configured to connect with a recipient container to output a mixture of the first substance and the second substance, and a mixing chamber having a first portion in communication with the first port and the second port and a second portion in communication with the third port. The adapter may further include a mixing pin inserted into the mixing chamber. In some embodiments, the mixing pin at least partially defines at least one microfluidic path for mixing the first substance and the second substance. In some embodiments, at least one of the first channel and the second channel are oriented offset of a central plane of the body.

28 Claims, 17 Drawing Sheets

(52) U.S. Cl.
CPC . *B01L 3/502761* (2013.01); *B01L 2300/0829* (2013.01); *B01L 2400/088* (2013.01)

(58) Field of Classification Search
CPC ........ B05C 17/00553; B05C 17/00593; B05C 17/00596
See application file for complete search history.

(56) References Cited

U.S. PATENT DOCUMENTS

| | | | | |
|---|---|---|---|---|
| 4,027,857 | A | 6/1977 | Cunningham | |
| 4,040,420 | A | 8/1977 | Speer | |
| 4,204,775 | A | 5/1980 | Speer | |
| 4,261,481 | A | 4/1981 | Speer | |
| 4,305,672 | A | 12/1981 | Adams | |
| 4,895,452 | A | 1/1990 | Yiournas et al. | |
| 5,104,375 | A | 4/1992 | Wolf et al. | |
| 5,630,800 | A | 5/1997 | Blank et al. | |
| 5,746,791 | A | 5/1998 | Wang | |
| 6,840,921 | B1 | 1/2005 | Haider et al. | |
| 6,919,046 | B2 | 7/2005 | O'Connor et al. | |
| 6,981,522 | B2 | 1/2006 | O'Connor et al. | |
| 7,404,969 | B2 | 7/2008 | Chen et al. | |
| 7,514,099 | B2 | 4/2009 | Chen et al. | |
| 7,641,915 | B2 | 1/2010 | Chen et al. | |
| 7,691,405 | B2 | 4/2010 | Chen et al. | |
| 7,745,651 | B2 | 6/2010 | Heyes et al. | |
| 7,794,136 | B2 | 9/2010 | Yang et al. | |
| 7,799,565 | B2 | 9/2010 | MacLachlan et al. | |
| 7,802,591 | B2 | 9/2010 | Barrow et al. | |
| 7,803,397 | B2 | 9/2010 | Heyes et al. | |
| 7,893,302 | B2 | 2/2011 | Chen et al. | |
| 7,901,708 | B2 | 3/2011 | MacLachlan et al. | |
| 7,982,027 | B2 | 7/2011 | MacLachlan et al. | |
| 8,058,069 | B2 | 11/2011 | Yaworksi et al. | |
| 8,100,295 | B2 | 1/2012 | Keller | |
| 8,227,248 | B2 | 7/2012 | Kikuchi et al. | |
| 8,240,511 | B2 | 8/2012 | Greter et al. | |
| 8,329,070 | B2 | 12/2012 | MacLachlan et al. | |
| 8,492,359 | B2 | 7/2013 | Yaworski et al. | |
| 8,569,256 | B2 | 10/2013 | Heyes et al. | |
| 8,747,869 | B2 | 6/2014 | Irvine et al. | |
| 8,753,325 | B2 | 6/2014 | Lev et al. | |
| 8,822,668 | B2 | 9/2014 | Yaworski et al. | |
| 8,920,832 | B2 | 12/2014 | Kikuchi et al. | |
| 8,951,542 | B2 | 2/2015 | Irvine et al. | |
| 8,956,572 | B2 | 2/2015 | Knopov et al. | |
| 9,005,654 | B2 | 4/2015 | MacLachlan et al. | |
| 9,006,417 | B2 | 4/2015 | Yaworski et al. | |
| 9,018,187 | B2 | 4/2015 | Heyes et al. | |
| 9,080,186 | B2 | 7/2015 | Cui et al. | |
| 9,139,554 | B2 | 9/2015 | Hope et al. | |
| 9,149,432 | B2 | 10/2015 | Irvine et al. | |
| 9,181,545 | B2 | 11/2015 | MacLachlan et al. | |
| 9,198,860 | B2 | 12/2015 | Ishii et al. | |
| 9,339,462 | B2 | 5/2016 | Irvine et al. | |
| 9,364,435 | B2 | 6/2016 | Yaworski et al. | |
| 9,370,489 | B2 | 6/2016 | Yang et al. | |
| 9,375,692 | B2 | 6/2016 | Greter et al. | |
| 9,381,477 | B2 | 7/2016 | Karnik et al. | |
| 9,404,127 | B2 | 8/2016 | Yaworski et al. | |
| 9,492,386 | B2 | 11/2016 | MacLachlan et al. | |
| 9,504,651 | B2 | 11/2016 | MacLachlan et al. | |
| 9,518,272 | B2 | 12/2016 | Yaworski et al. | |
| 9,579,338 | B2 | 2/2017 | Knopov et al. | |
| 9,616,032 | B2 | 4/2017 | Emanuel et al. | |
| 9,668,980 | B2 | 6/2017 | DeRosa et al. | |
| 9,717,686 | B2 | 8/2017 | Yang et al. | |
| 9,758,795 | B2 | 9/2017 | Cullis et al. | |
| 9,861,752 | B2 | 1/2018 | Buder et al. | |
| 9,873,669 | B2 | 1/2018 | Suzuki et al. | |
| 9,926,560 | B2 | 3/2018 | MacLachlan et al. | |
| 9,943,463 | B2 | 4/2018 | Marks et al. | |
| 9,943,846 | B2 | 4/2018 | Cullis et al. | |
| 10,041,091 | B2 | 8/2018 | Cullis et al. | |
| 10,076,730 | B2 | 9/2018 | Wild et al. | |
| 10,087,464 | B2 | 10/2018 | Hayes et al. | |
| 10,105,731 | B2 * | 10/2018 | Ettlin | B67D 7/741 |
| 10,131,633 | B2 | 11/2018 | Suzuki et al. | |
| 10,155,945 | B2 | 12/2018 | Knopov et al. | |
| 10,159,652 | B2 | 12/2018 | Walsh et al. | |
| 10,213,385 | B2 | 2/2019 | Yang et al. | |
| 10,299,636 | B2 | 5/2019 | Ophardt et al. | |
| 10,342,761 | B2 | 7/2019 | Bowman et al. | |
| 10,597,291 | B2 | 3/2020 | Wild et al. | |
| 10,688,456 | B2 | 6/2020 | Wild et al. | |
| 10,835,878 | B2 | 11/2020 | Wild et al. | |
| 10,843,194 | B2 | 11/2020 | Cullis et al. | |
| 11,141,378 | B2 | 10/2021 | Yaworski et al. | |
| 2003/0048694 | A1 | 3/2003 | Horner et al. | |
| 2009/0326279 | A1 | 12/2009 | Tonkovich et al. | |
| 2012/0175384 | A1 | 7/2012 | Greter et al. | |
| 2014/0248621 | A1 | 9/2014 | Collins | |
| 2015/0190770 | A1 | 7/2015 | Greter et al. | |
| 2017/0348244 | A1 | 12/2017 | DeRosa et al. | |
| 2018/0153822 | A1 | 6/2018 | Karve et al. | |
| 2018/0221402 | A1 | 8/2018 | Prieve et al. | |
| 2018/0263918 | A1 | 9/2018 | DeRosa et al. | |
| 2019/0017073 | A1 | 1/2019 | Hayes et al. | |
| 2019/0032087 | A1 | 1/2019 | Cullis et al. | |
| 2019/0071669 | A1 | 3/2019 | MacLachlan et al. | |
| 2019/0240354 | A1 | 8/2019 | Abrams et al. | |
| 2019/0298857 | A1 | 10/2019 | Ying et al. | |
| 2019/0321295 | A1 | 10/2019 | Bowman et al. | |
| 2019/0336452 | A1 | 11/2019 | Brader et al. | |
| 2020/0016562 | A1 | 1/2020 | Panagiotou | |
| 2020/0069599 | A1 | 3/2020 | Smith et al. | |
| 2020/0085745 | A1 | 3/2020 | Karve et al. | |
| 2020/0306191 | A1 | 10/2020 | Schariter et al. | |
| 2021/0023514 | A1 | 1/2021 | Ramsay et al. | |
| 2021/0023556 | A1 | 1/2021 | Cullis et al. | |
| 2021/0046192 | A1 | 2/2021 | Karve et al. | |
| 2021/0162052 | A1 | 6/2021 | Thomas et al. | |
| 2021/0259971 | A1 | 8/2021 | Matsuzaki | |
| 2021/0267891 | A1 | 9/2021 | MacLachlan et al. | |
| 2021/0275455 | A1 | 9/2021 | MacLachlan et al. | |
| 2021/0275689 | A1 | 9/2021 | Karve et al. | |
| 2021/0283262 | A1 | 9/2021 | Dominy et al. | |
| 2021/0284998 | A1 | 9/2021 | Thomas et al. | |
| 2023/0105059 | A1 | 4/2023 | Lee et al. | |

FOREIGN PATENT DOCUMENTS

| | | | |
|---|---|---|---|
| EP | 1413346 | A1 | 4/2004 |
| EP | 1453606 | A2 | 9/2004 |
| EP | 1531003 | A1 | 5/2005 |
| EP | 1648519 | A2 | 4/2006 |
| EP | 1664316 | A1 | 6/2006 |
| EP | 1781593 | A2 | 5/2007 |
| EP | 1937213 | A1 | 7/2008 |
| EP | 2338478 | A1 | 6/2011 |
| EP | 2415463 | A1 | 2/2012 |
| EP | 2430168 | A1 | 3/2012 |
| EP | 2496700 | A1 | 9/2012 |
| EP | 2567693 | A1 | 3/2013 |
| EP | 2569276 | A1 | 3/2013 |
| EP | 2675918 | A2 | 12/2013 |
| EP | 2711749 | A1 | 3/2014 |
| EP | 2823809 | A1 | 1/2015 |
| EP | 2915581 | A1 | 9/2015 |
| EP | 2918267 | A1 | 9/2015 |
| EP | 3033325 | A1 | 6/2016 |
| EP | 3057693 | A1 | 8/2016 |
| EP | 3093283 | A1 | 11/2016 |
| EP | 3169309 | A1 | 5/2017 |
| EP | 3247328 | A1 | 11/2017 |
| EP | 3398680 | A1 | 11/2018 |
| EP | 3468537 | A1 | 4/2019 |
| EP | 3478838 | A1 | 5/2019 |
| EP | 3493834 | A1 | 6/2019 |
| EP | 3538067 | A1 | 9/2019 |
| EP | 3538073 | A1 | 9/2019 |
| EP | 3675817 | A1 | 7/2020 |
| EP | 3705179 | A1 | 9/2020 |
| EP | 3797860 | A1 | 3/2021 |

(56) References Cited

FOREIGN PATENT DOCUMENTS

| | | | |
|---|---|---|---|
| EP | 3843709 | A1 | 7/2021 |
| EP | 3852728 | A1 | 7/2021 |
| EP | 3852911 | A1 | 7/2021 |
| EP | 3866825 | A1 | 8/2021 |
| FR | 2301281 | A1 | 9/1976 |
| GB | 2339545 | A | 2/2000 |
| JP | H10216491 | A | 8/1998 |
| JP | 2019103986 | A | 6/2019 |
| WO | 03/008101 | A1 | 1/2003 |
| WO | 03/045559 | A2 | 6/2003 |
| WO | 2005/007196 | A2 | 1/2005 |
| WO | 2005/026372 | A1 | 3/2005 |
| WO | 2005/120152 | A2 | 12/2005 |
| WO | 2007/012191 | A1 | 2/2007 |
| WO | 2010/135207 | A1 | 11/2010 |
| WO | 2011/140627 | A1 | 11/2011 |
| WO | 2011/141705 | A1 | 11/2011 |
| WO | 2012/112730 | A2 | 8/2012 |
| WO | 2015/011633 | A1 | 1/2015 |
| WO | 2015/057998 | A1 | 4/2015 |
| WO | 2016/010840 | A1 | 1/2016 |
| WO | 2016/118697 | A1 | 7/2016 |
| WO | 2017/218704 | A1 | 12/2017 |
| WO | 2018/006052 | A1 | 1/2018 |
| WO | 2018/029586 | A1 | 2/2018 |
| WO | 2018/041921 | A1 | 3/2018 |
| WO | 2018/089540 | A1 | 5/2018 |
| WO | 2018/089801 | A1 | 5/2018 |
| WO | 2019/046809 | A1 | 3/2019 |
| WO | 2019/139997 | A1 | 7/2019 |
| WO | 2020/047061 | A1 | 3/2020 |
| WO | 2020/061426 | A2 | 3/2020 |
| WO | 2020/061457 | A1 | 3/2020 |
| WO | 2020/081933 | A1 | 4/2020 |
| WO | 2020/160397 | A1 | 8/2020 |
| WO | 2020/219941 | A1 | 10/2020 |
| WO | 2021/007278 | A1 | 1/2021 |
| WO | 2021/016430 | A1 | 1/2021 |
| WO | 2021/155274 | A1 | 8/2021 |
| WO | 2021/173840 | A1 | 9/2021 |
| WO | 2022161373 | A1 | 8/2022 |

OTHER PUBLICATIONS

International Search Report dated Dec. 4, 2024 issued in PCT/US2023/034399.

Written Opinion dated Dec. 4, 2024 issued in PCT/US2023/034399.

* cited by examiner

METHODS AND ADAPTERS FOR MIXING PHARMACEUTICAL COMPLEXES

CROSS REFERENCE TO RELATED APPLICATIONS

The patent application claims the benefit of U.S. Provisional Patent App. No. 63/378,230 filed on Oct. 3, 2022, the entire disclosure of which is expressly incorporated herein by reference.

TECHNICAL FIELD

The disclosure relates to adapter, systems, and methods of use for mixing at least two substances to produce a pharmaceutical complex.

BACKGROUND

Recent developments in immunology include newly-approved messenger RNA encapsulated lipid nanoparticle (mRNA-LNP) vaccines. Messenger RNA (mRNA) technology has the advantage of being able to rapidly adapt to new antigen designs by altering the mRNA sequence without needing to overhaul the Chemical & Manufacturing Control (CMC) of the vaccine production. However, mRNA provided alone is not readily absorbed or delivered effectively to human immune cells and has unstable chemical and physical properties, therefore is not effective for use as a vaccine. Recent developments have shown that absorption and stability of mRNA can be increased to effective levels if it is encapsulated within lipid nanoparticle (LNP) vectors.

Preparation of mRNA-LNP vaccines is achieved by mixing lipids dissolved ethanol with RNA in buffers, under closely controlled conditions. Such mixing is usually carried out in a laboratory using devices which are often inappropriate for high-scale distribution, due to their low durability, high cost, high complexity, low lot-to-lot consistency and/or high inter-batch variation.

SUMMARY

The present inventors recognize that the shelf life of mRNA-LNP at room temperature is limited. To extend the shelf life, mRNA-LNP vaccines must be stored at extremely low temperatures (typically −20 to −80 degrees Celsius). This is a problem because low temperature distribution is expensive and logistically complex. Additionally, there is a risk of mRNA-LNP vaccines being wasted if, for example, the low-temperature environment at any stage in the distribution chain were to fail.

Non-messenger RNA drugs, such as RNAi, siRNA and other oligonucleotides can also be formed into lipid nanoparticle compositions (RNA-LNP). RNA-LNP drugs can be chemically modified to improve their stability and shelf life at room temperature (such chemical modification is not possible for mRNA-LNP technology which requires interaction with cellular proteins to function appropriately). Chemical modification of RNA-LNP can be difficult and expensive to achieve but is nonetheless often preferred to avoid the significant distribution costs associated with non-modified RNA-LNP drugs which must similarly be kept at very low temperatures, as well as the difficulty associated with managing drug efficacy over time due to the limited molecular half-life.

In short, the low temperature requirements present a major challenge for distribution and development. Other problems associated with known systems for producing nanoparticle compositions include limited scalability, usability, and/or reliability. One or more of the foregoing needs are met by the various embodiments as disclosed herein.

A first aspect of the present disclosure is directed to an adapter having: a body having a first port configured to connect with a first container to receive a first substance, a second port configured to connect with a second container to receive a second substance, a third port configured to connect with a recipient container to output a mixture of the first substance and the second substance, and a mixing chamber having a first portion in communication with the first port and the second port and a second portion in communication with the third port; and a mixing pin inserted into the mixing chamber wherein the mixing pin at least partially defines at least one microfluidic path for mixing the first substance and the second substance.

The adapter may have one or more of the following features. The body further may have an opening in the first portion of the mixing chamber configured to receive the mixing pin. The mixing pin may be removable from the mixing chamber. The mixing pin may have a flange, and the body may have a recess configured to receive the flange. The mixing pin may have a sealing portion configured to seal the first portion of the mixing chamber. The first port and/or the second port may be substantially parallel to the mixing chamber. The body may further include a first branch channel in communication with the first port and extending at a first angle relative to the mixing chamber, and a second branch channel in communication with the second port and extending at a second angle relative to the mixing chamber. The first angle and/or the second angle may be greater than 90 degrees. The first angle and/or the second angle may be about 120 to about 160 degrees. The adapter may further include a first plug inserted into an end of the first branch channel, and a second plug inserted into an end of the second branch channel. The first branch channel may be configured to guide the first substance toward the mixing pin, and the second branch channel is configured to guide the second substance toward the mixing pin. The mixing pin defines a first edge surface may be formed by a first surface and a second surface and a second edge formed by a third surface and a fourth surface, the first edge is configured to divide the first substance, and the second edge is configured to divide the second substance. The first port may be a female Luer connector, the second port may be a female Luer connector, and the third port is a male Luer connector. The at least one microfluidic path may be tortuous. The at least microfluidic path may be formed by at least one channel. The at least one channel may have a dimension of about 200 μm to about 1000 μm. The at least one channel may have a dimension of about 400 μm to about 600 μm. The at least one channel may include at least one helical channel. The at least one helical channel may include a first helical channel and a second helical channel, wherein the first helical channel and the second helical channel intersect along a longitudinal length of the mixing pin at a plurality of intersection points. The at least one channel may extend through the mixing pin. The mixing pin may include a plurality of protrusions that extend at least partially around a circumference of the mixing pin and define at least a portion of the at least one channel. The plurality of protrusions may extend uniformly around the circumference of the mixing pin and form at least one radial gap with respect to an inner surface of the body, the at least one radial gap forming at least a portion of the at least one channel. Each of the plurality of protrusions may have at least one first surface configured to create a seal against an inner surface of the body and at least one second surface forming at least one radial gap with respect to the inner surface of the body, the at least one radial gap forming at least a portion of the at least one channel.

A second aspect of the present disclosure is directed to a system having: an aqueous solution; a lipid solution; a first container configured to receive the aqueous solution; a second container configured to receive the lipid solution; a recipient container; an adapter including: a body having: a first port configured to connect with the first container and to receive the aqueous solution, a second port configured to connect with the second container and to receive the lipid solution, a third port configured to connect with the recipient container to output a mixture of the aqueous solution and the lipid solution, a mixing chamber extending between a first portion in communication with the first port and the second port and a second portion in communication with the third port; and a mixing pin configured to be inserted into the mixing chamber wherein the mixing pin at least partially defines at least one microfluidic path for mixing the aqueous solution and the lipid solution.

The system may have one or more of the following features. The system may include a second pin configured to be inserted into the mixing chamber, wherein the second mixing pin has a different geometry than the mixing pin. The system may include a first storage container containing the aqueous solution, and a second storage container containing the lipid solution.

A third aspect of the present disclosure is directed to a method including: introducing a first substance into a first port of an adapter; introducing a second substance into a second port of the adapter; mixing the first substance and the second substance in at least microfluidic path through, along, and/or around a mixing pin in the adapter; and producing a pharmaceutical complex with the first substance and the second substance.

The method may have one or more of the following features. The first substance may be an aqueous solution, the second substance may be a lipid solution, and the pharmaceutical complex may include lipid nanoparticles.

A fourth aspect of the present disclosure is directed to an adapter including: a body having: a first port configured to connect with a first container to receive a first substance, a first channel in communication with the first port, a second port configured to connect with a second container to receive a second substance, a second channel in communication with the second port, a third port configured to connect with a recipient container to output a mixture of the first substance and the second substance, a mixing chamber having a first portion in communication with the first port and the second port and a second portion in communication with the third port; and a mixing pin inserted into the mixing chamber, wherein at least one of the first channel and the second channel is oriented offset of a central plane of the body.

The adapter may have one or more of the following features. The body may include an opening in the first portion of the mixing chamber configured to receive the mixing pin. The mixing pin may be removable from the mixing chamber. The mixing pin may have an end cap, and the body may have a rim configured to engage the end cap. The adapter may include a sealing member configured to seal the first portion of the mixing chamber. The first port and/or the second port may be substantially parallel to the mixing chamber. The first channel may extend at a first angle relative to the mixing chamber, and the second channel may extend at a second angle relative to the mixing chamber. The first angle and/or the second angle may be greater than 90 degrees. The first angle and/or the second angle may be about 120 to about 160 degrees. The adapter may include a first plug in an end of the first channel, and a second plug in an end of the second channel. The first channel and the second channel may be offset of the central plane of the mixing pin. The first channel and the second channel may be on the same side of a lateral axis of the adapter body. The first channel and the second channel may be on opposite sides of a lateral axis of the adapter body. The first channel and the second channel may be connected to the body at different longitudinal positions. The first port may be a female Luer connector, the second port may be a female Luer connector, and the third port may be a male Luer connector. The mixing pin may form by at least one channel. The at least one channel may have a dimension of about 200 μm to about 1000 μm. The at least one channel may have a dimension of about 400 μm to about 600 μm. The at least one channel may include at least one helical channel.

A fifth aspect of the present disclosure is directed to a system including: an aqueous solution; a lipid solution; a first container configured to receive the aqueous solution; a second container configured to receive the lipid solution; a recipient container; an adapter including: a body having: a first port configured to connect with the first container and to receive the aqueous solution, a second port configured to connect with a second container and to receive the lipid solution, a third port configured to connect with a recipient container to output a mixture of the aqueous solution and the lipid solution, a mixing chamber extending between a first portion in communication with the first port and the second port and a second portion in communication with the third port; and a mixing pin configured to be inserted into the mixing chamber, wherein at least one of the first channel and the second channel are oriented offset of a central plane of the body.

The system may have one or more of the following features. The system may include a second pin configured to be inserted into the mixing chamber, wherein the second mixing pin has a different geometry than the mixing pin. The system may include a first storage container containing the aqueous solution, and a second storage container containing the lipid solution.

A sixth aspect of the present disclosure is directed to a method having: introducing a first substance into a first port of an adapter body and through a first channel of the adapter body; introducing a second substance into a second port of the adapter body and through a second channel of the adapter body; mixing the first substance and the second substance around a mixing pin in the adapter body, wherein at least one of the first channel and the second channel is oriented offset of a central plane of the adapter body; and producing a pharmaceutical complex with the first substance and the second substance.

The method may have one more of the following features. The first substance may be an aqueous solution, the second substance may be a lipid solution, and the pharmaceutical complex may include lipid nanoparticles.

BRIEF DESCRIPTION OF THE DRAWINGS

Specific embodiments of the present disclosure are described below in the detailed description by way of example only and with reference to the accompanying drawings, in which.

The same reference numbers are used in the drawings and the following detailed description to refer to the same or similar parts.

DETAILED DESCRIPTION

An adapter is provided for connecting one or more fluid containers for microfluidic mixing first and second substances to produce a pharmaceutical complex. The adapter may include a first port or connector member configured to connect to a first container, a second port or connector member configured to connect to a second container, and a third port or connector member configured to connect to a recipient container. The adapter further includes a mixing chamber extending from a first portion in fluid communication with the first port and the second port to a second portion in communication with the third port. A mixing pin may be received in the mixing chamber and at least partially define at least one microfluidic path through, longitudinally along, and/or circumferentially around the mixing pin. The at least one path may induce turbulence in the flow of fluid through the mixing chamber to mix fluid constituents as they flow through the adapter to the recipient container.

In some embodiments, the at least one path may be tortuous and be configured to induce localized changes in the flow direction of the constituents flowing through the mixing chamber. In some embodiments, the at least one path may include a plurality of paths. In some embodiments, the plurality of paths may have a plurality of intersection points configured to induce localized changes in the flow direction of liquid moving through the mixing chamber. In some embodiments, the at least one path may have a variable width or diameter configured to cause repeated accelerations and decelerations, thus inducing turbulence. In some embodiments, the at least one path may produce a vortex flow to produce mixing with high turbulence.

The adapter of the present disclosure may provide an improvement over planar microfluidic chips by creating a three-dimensional microfluidic template for mixing. The three-dimensional microfluidic template as discussed herein allows for improved mixing by increasing the volume and flow rates while reducing the hydraulic pressure of the channels. For example, the adapter may have larger microfluidic channels or flow paths (e.g., about 400 to about 1000 μm) than microfluidic chips and/or provide a plurality of flow paths that may converge along the length of the adapter increasing the mixing. Thus, the adapter may have larger features that are easier and/or cheaper to manufacture, for example, through injection molding or 3D printing. The adapter may fill in a big gap in the space of LNPs synthesis. The various embodiments of the at least one path may provide an easy to use, consistent, safe, and/or convenient method of mixing components at a point of care. The adapter may be used either as a manual device (e.g., with syringes) in a small-scale setting or in an automated configuration targeting broad customer segments working in early preclinical stages to potentially scale up manufacturing.

Figure 1:
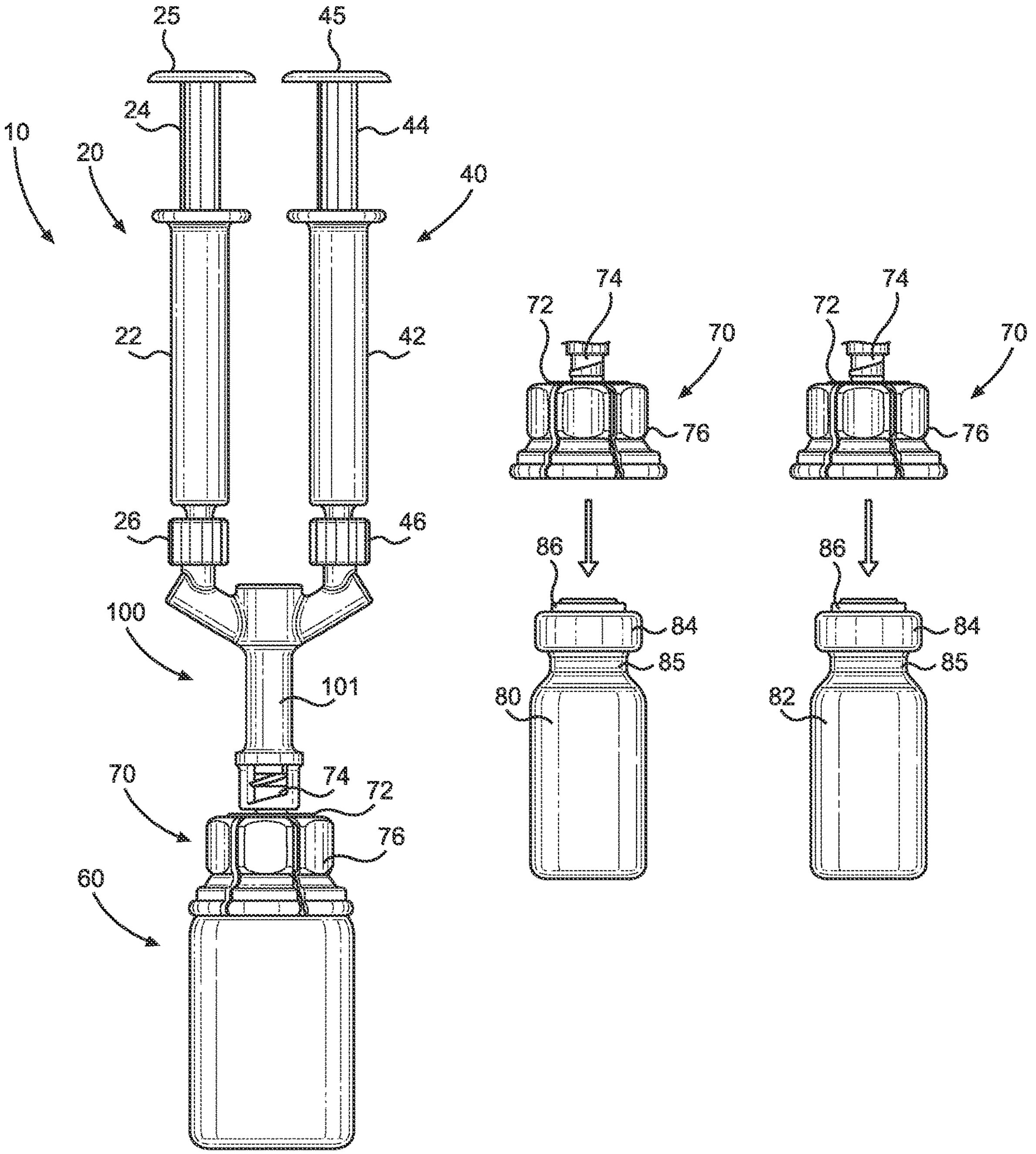
FIG. 1 illustrates a side view of an exemplary system according to the present disclosure.
Figure 2:
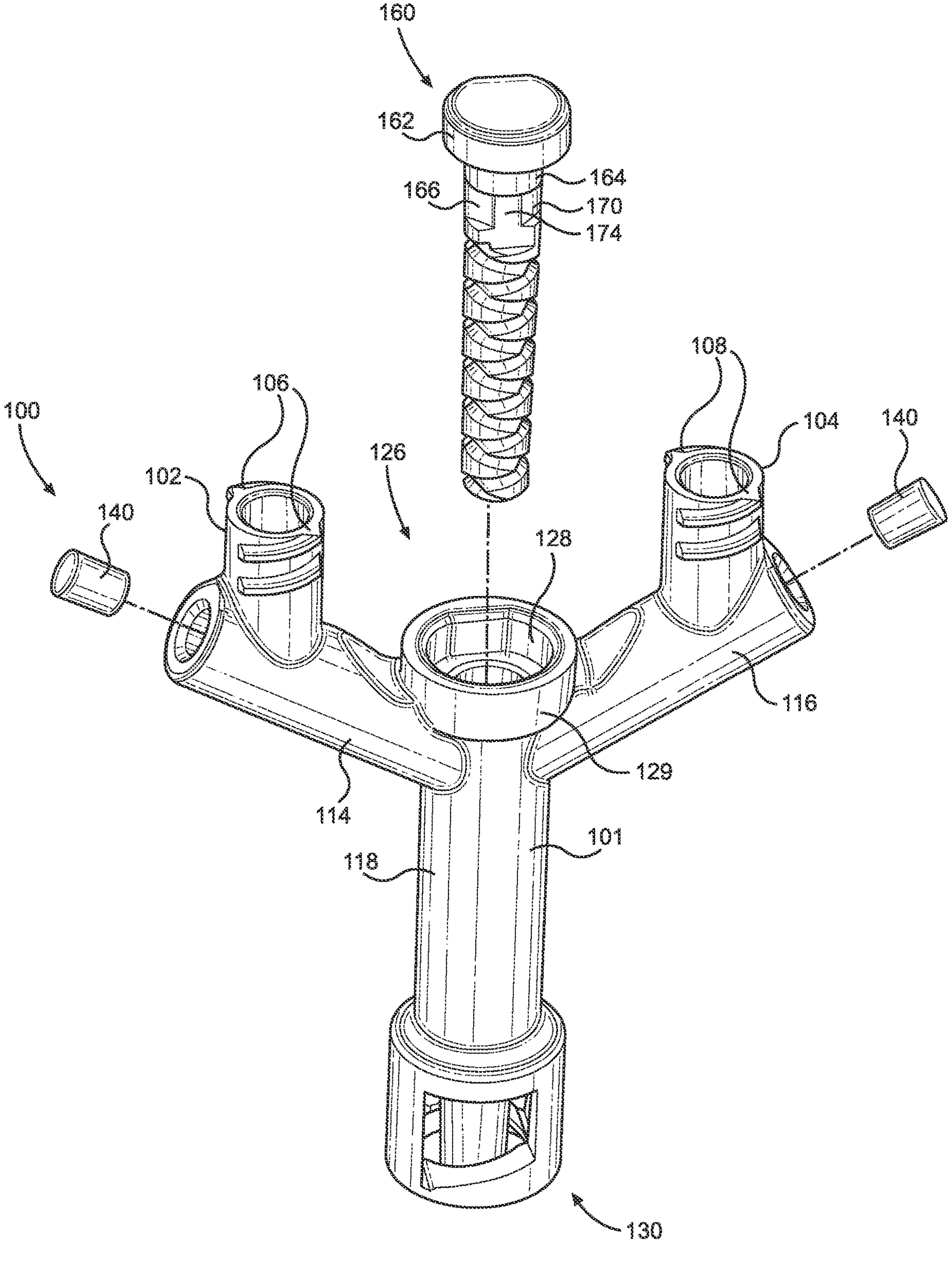
FIG. 2 illustrates an exploded view of a first embodiment of an adapter of the system of FIG. 1.

FIGS. 1 and 2 illustrate a system 10 including a first container 20, a second container 40, a recipient container 60, an adapter 100, and a mixing pin 160. In some embodiments, the system 10 may further include a first storage container 80 containing a first substance or constituent and a second storage container 82 containing a second substance or constituent. The first container 20 may be configured to transfer the first substance from the first storage container 80 into the adapter 100. The second container 40 may be configured to transfer the second substance from the second storage container 82 into the adapter 100. The adapter 100 may include at least one path configured to mix the first substance and the second substance and transfer the pharmaceutical complex to the recipient container 60. The system 10 may constitute a kit of at least one or all of the first container 20, the second container 40, the recipient container 60, the adapter 100, the mixing pin 160, the first storage container 80, and/or the second storage container 82. The system 10 and/or kit may further include one or more vial adapters 70 for fluid transfer to or from one or more of the recipient container 60, the first storage container 80, and/or the second storage container 82. The components of the kit may be include packaging for transportation to the end user. Although illustrated with the adapter 100 and the mixing pin 160, the system 10 and/or the kit may include any one or more of the adapter 100, 500, 600, 700 and/or the mixing pin 160, 260, 360, 460, 660, 760. In some embodiments, the system 10 and/or the kit may include a single adapter and a plurality of the mixing pins 160, 260, 360, 460, 660, 760 of the same or different geometry. For example, a plurality of different types of mixing pins 160, 260, 360, 460, 660, 760 may be included in the system 10 and/or the kit, such that the end user may select or interchange the mixing pins 160, 260, 360, 460, 660, 760 based on the intended purpose and/or constituents.

The first container 20 may be a variable volume container, such as a first syringe configured to at least temporarily store and/or transfer the first substance from the first storage container 80 to the adapter 100. The second container 40 may be a variable volume container, such as a second syringe configured to store and transfer the second substance from the storage container 82 to the adapter 100. The first syringe 20 may include a first syringe body 22 and a first plunger rod 24, and the second syringe 40 may include a second syringe body 42 and a second plunger rod 44. Each syringe body 22, 42 may have a syringe barrel extending from a proximal end to a distal end along a longitudinal direction. Each syringe body 22, 42 may have a syringe tip at the distal end and a flange at the proximal end. The syringe barrel may be tubular having an inner surface extending along the longitudinal direction to define a chamber. The chamber may be configured to receive, store, and/or mix the substance for dispensing through a distal opening of the syringe tip. The first plunger rod 24 may have a first flange 25 at a proximal end, and the second plunger rod 44 may have a second flange 45 at a proximal end. The syringe tip of the first syringe body 22 may include a first connector 26 for engagement with an external device, such as a syringe needle, a container, and/or the adapter 100. The syringe tip of the second syringe body 42 may include a second connector 46 for engagement with the same or different external device, such as a syringe needle, a container, and/or the adapter 100. Each connector 26, 46 may further include a male Luer connector including the syringe tip and a threaded sleeve around the tip. The syringe tip may be tapered to guide fluid flow into the external device (e.g., the adapter 100), and the sleeve may have an internal thread configured to secure the syringe 20, 40 to the respective external device (e.g., the adapter 100). The containers 20, 40 may be any conventional type of syringe and/or reciprocating pump which is suitable for use in a pharmaceutical setting.

The flange 25, 45 may be actuated either by being pulled to create a negative pressure to pull a substance into the chamber and/or being pushed to create a positive pressure to push the substance out of the chamber. At least part of the first syringe 20 and the second syringe 40 may be integrally or releasably connected to enable joint handling and/or actuation of the first syringe 20 and the second syringe 40. For example, the system 10 may further have a barrel holder (not shown) having a first lumen configured to receive the first syringe body 22 and a second lumen configured to receive the second syringe body 42, such that the first syringe 20 and the second syringe 40 may be handled together. Each of the first and second lumens may be closed or be formed by C-shaped walls configured to snap around the respective syringe body 22, 42. The barrel holder may fix the syringe bodies 22, 42 in a substantially parallel arrangement. The system may further include a plunger clip configured to translate the plunger rods 24, 44 through the syringe bodies 22, 42 together to push and/or pull the material with the same longitudinal translation. For example, the plunger clip may be configured to attach to the flanges 25, 26, such as having a groove configured to releasably receive the flanges 25, 45. Embodiments of the barrel holder and/or the plunger clip are further discussed in U.S. Pat. Nos. 5,104,375, 6,840,921, and 8,240,511, the entire disclosures of which are expressly incorporated herein by reference.

The recipient container 60 may be a fixed volume container, such as a vial attachable to the adapter 100 with a vial adapter 70. The vial 60 may include a vial bottle 62 enclosing a chamber and having a crown and a neck. The chamber may be sealed by a drug vial seal at the crown attached circumferentially by an aluminum band. The vial adapter 70 may have a transverse top wall 72, a connector 74 extending upwardly from the top wall 72, and a skirt 76 extending downwardly from the top wall 72. The connector 74 may be a female Luer connector including an external screw thread for screw thread engagement by a male Luer lock connector, such as that of the adapter 100. The skirt 76 may be for telescopic mounting over the crown and/or the neck of the vial 60. The skirt 76 may surround a cannula (not shown) extending downwardly from the top wall 72 and be configured to puncture the vial stopper. The cannula may have a lumen in fluid communication with the chamber of the vial bottle 62 when puncturing the vial stopper. The vial adapter 70 may be vented in order to draw air into the container 60 and to ease drawing the fluid through the system. Further discussion of embodiments of the container 60 and/or the vial adapters 70 is provided in U.S. Pat. Nos. 8,753,325 and 9,943,463, the entire disclosures of which are expressly incorporated herein by reference. The recipient container 60 may be initially container a buffer solution and be configured to receive material injected from the first and second containers 20, 40 and mixed in the adapter 100. Once the first and second constituents are introduced into the adapter 100, the resultant pharmaceutical complex may be stored within the recipient container 60.

However, in some embodiments, the recipient container 60 may be a variable volume container, such as a syringe, and one or both of the first and second containers 20, 40 may be fixed volume containers, such as vials. Further discussion of such embodiments is provided in U.S. Pat. Pub. 2023/0105059, the entire disclosure of which is expressly incorporated herein by reference. It is also contemplated that the first and second containers 20, 40 may be embodied as first and second containers 20, 40 connected to a pump. Flow sensors may be connected to the first and second containers 20, 40 to control the flow rate for the first and second substances.

The first storage container 80 and/or the second storage container 82 may have similar structure as the recipient container 60, the discussion of which is expressly incorporated herein in its entirety. For example, each of the first and second storage containers 80, 82 may be a fixed volume container, such as an enclosing a chamber and having a crown 84 and a neck 85. The chamber may be sealed by a drug vial seal 86 at the crown 84 attached circumferentially by an aluminum band. Each of the first and second storage containers 80, 82 may be attached to a vial adapter 70, as discussed with reference to the recipient container 60.

The first substance of the first storage container 80 may be an aqueous solution. The aqueous solution may be any aqueous buffers which may be used for dissolving nucleic acids. For example, in some embodiments, the aqueous solution may be a solution of 20 mM Citrate and 300 mM NaCl and have a pH in the range of 3 to 6. In some embodiments, the aqueous solution may be 20 mM phosphate buffer solution (PBS) at pH 7. In some embodiments, the aqueous solution may be a solution of 5 mM to 25 mM Sodium acetate buffer with pH range from 4 to 6.

The second substance of the second storage container 82 may be a lipid solution having a composition comprising in whole, or in part, an organic solvent having a lipid or mixture of lipids. The lipid solution may include clinical grade lipids solubilized in an organic alcohol solution (e.g., ethanol). In some embodiments, the lipid solution may be at least 25% alcoholic solution. In some embodiments, the lipid solution may be at least 40% alcoholic solution. In some embodiments, the lipid solution may be at least 60% alcoholic solution. The alcoholic solution is preferably an ethanolic solution. Providing the lipid in an increased concentration of alcohol (e.g., greater than 40% alcoholic solution) may allow the lipid in alcoholic solution to withstand dilution by a reconstituting agent without affecting the quality of the resulting pharmaceutical complex. The lipids compositions in ethanol solution may be composed of an ionizable lipid or cationic lipids or synthetic lipids, structural lipids, a PEG-lipid or its derivative and cholesterol or its derivatives. However, the second substance may include other nanoparticle forming solutions.

The therapeutic agent may be carried in at least one of the first substance and/or the second substance. In a preferred embodiment, the therapeutic agent is carried in the first substance. The therapeutic agent may include a nucleic acid including gene editing complexes, a drug, a protein, oligonucleotides or the like. The nucleic acid may include RNA and/or DNA. The RNA may be in the form of oligonucleotide RNA, tRNA (transfer RNA), snRNA (small nuclear RNA), rRNA (ribosomal RNA), mRNA (messenger RNA), antisense RNA, siRNA (small interfering RNA), shRNA (short-hairpin RNA), ncRNA (non-coding RNA), aptamers, ribozymes, chimeric sequences, or derivatives of these groups. Gene editing complexes may include gRNA (guide RNA), cas 9 protein, mRNA or DNA encoding for cas 9 protein or the CRISPR-cas9 gRNA complex. The DNA may be in the form of antisense, plasmid DNA, parts of a plasmid DNA, pre-condensed DNA, product of a polymerase chain reaction (PCR), vectors (P1, PAC, BAC, YAC, artificial chromosomes), expression cassettes, chimeric sequences, chromosomal DNA, or derivatives of these groups.

In some embodiments, the therapeutic agent may be stored in a dehydrated and/or lyophilized state and be reconstituted in the aqueous solution to form the first substance prior to being introduced into the adapter 100. In this case, the first storage container 80 may hold the dehydrated therapeutic agent, and the first container 20 may hold the aqueous solution. The aqueous solution may then be introduced from the first container 20 into the first storage container 80 to reconstitute the therapeutic agent. The first solution including the therapeutic agent may then be introduced into the first container 20 to be introduced into the adapter.

The first substance (with the therapeutic agent in the lyophilized state or as a solution) and the second substance may be adapted for transportation and medium-term or long-term storage at room temperature. As such, the system 10 and adapter 100 disclosed herein may enable the obstacles associated with storing and transporting RNA-LNP complexes at prohibitively low temperatures to be mitigated. Furthermore, the adapter 100 may be easy to use at the point of care.

The first substance and the second substance may be mixed with the adapter as discussed herein. The mixing may generate liposomal formations that entrap the therapeutic agent coincident with formation of the liposomes. An electrostatic interaction between the negatively charged therapeutic agent (e.g., nucleic acid or mRNA) and positively charged cationic lipid may form LNPs encapsulating the therapeutic agent. When mRNA is included in the mixture, the LNPs may encapsulate the mRNA forming mRNA-LNPs. The pharmaceutical complex may be monodispersed LNPs. Accordingly, the system 10 and adapter 100 may be used to form a ready-to-inject RNA-LNP (for instance, mRNA-LNP) complex by mixing the constituents of the aqueous solution including RNA and the lipid solution. Considering the specific example of forming the mRNA-LNP pharmaceutical complex, the complex may be formed by mixing the first substance including mRNA (or RNA) from the first container 20 and the second substance of the lipid solution from the second container 40 via any of the adapters disclosed herein.

The first and second storage containers 80, 82 may be the same or different sizes based on the intended mixture. Any reference to two storage containers 80, 82 herein should therefore be construed as including three or more storage containers 80, 82. It will be appreciated that if more than two constituents are to be mixed then more than two containers may be provided, each of which may contain at least one constituent. Furthermore, any number of constituents can be provided in an unmixed state within a single container. In some embodiments, the first container 20 and the second container 40 may be prefilled with the respective substance, for example embodied as prefilled syringes, such that the first and second storage containers 80, 82 may be omitted.

Figure 4:
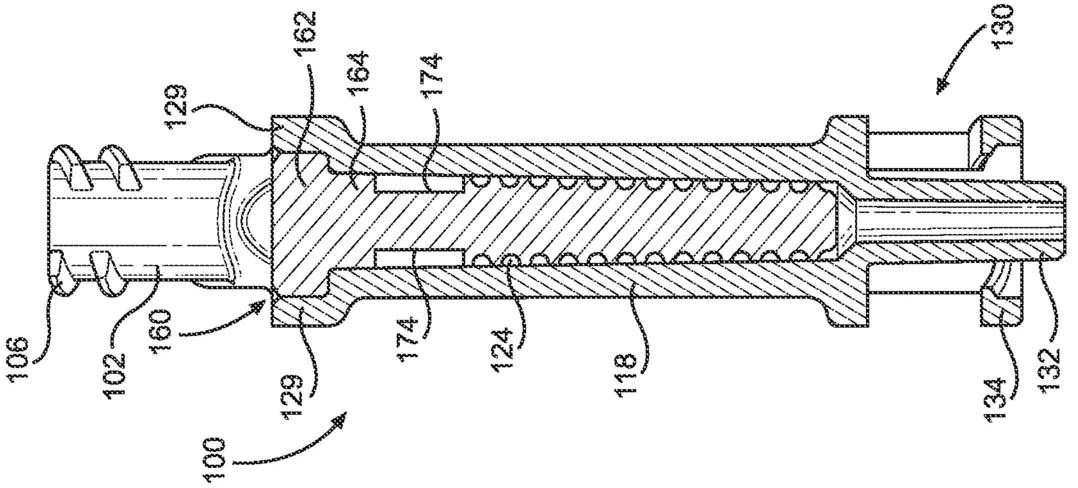
FIG. 4 illustrates a second cross-sectional view of the adapter of FIGS. 1-3.
Figure 3:
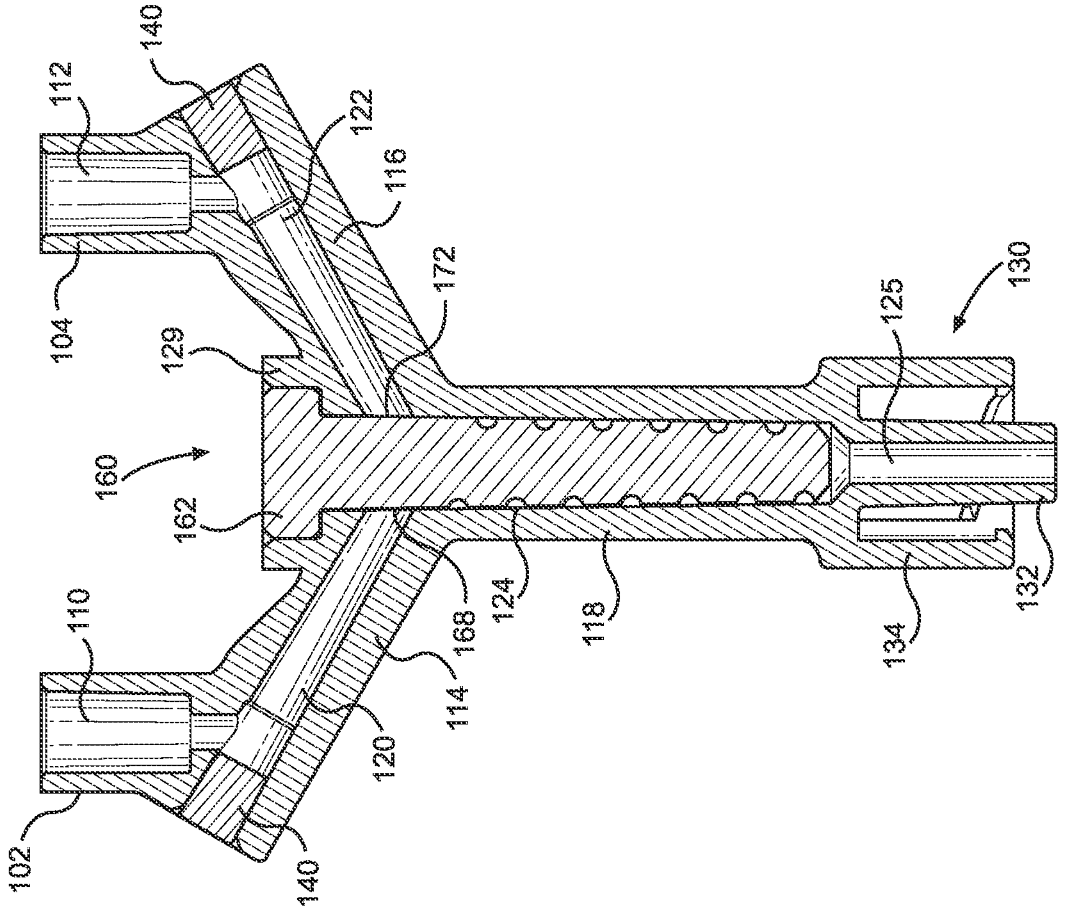
FIG. 3 illustrates a first cross-sectional view of the adapter of FIGS. 1 and 2.

As further illustrated in FIG. 2-4, the adapter 100 may include a body 101 having a first port 102 configured to connect to the syringe connector 26 of the first container 20 and a second port or connector member 104 configured to attach to the syringe connector 46 of the second container 40.

The first port 102 may be configured to be received by the first syringe connector 26 and have an external thread 106 configured to threadably engage the internal threads of the first connector 26. Similarly, the second port 104 may be configured to be received by the second connector 46 and have an external thread 108 around the second tubular member 104 configured to threadably engage the internal threads of the second syringe connector 46. For example, the ports 102, 104 may be a female Luer connector, and the connectors 26, 46 of the containers 20, 40 may be a male Luer connector. However, the ports 102, 104 may, additionally or alternatively, connect to the containers 20, 40 with other types of connections such as a snap-fit, friction-fit and/or a press-fit. The adapter 100 may be configured to connect to any number of the first and second containers 20, 40, the adapter 100 may have an equal number of ports 102, 104 for connecting to each of the containers 20, 40 accordingly. Furthermore, one or more of the ports 102, 104 may include a one-way valve (not shown) to allow fluid flow from the container 20, 40 into the adapter 100, and to restrict or substantially prevent fluid flow out of the adapter 100 back to the respective container 20, 40.

The first port 102 may define a first connector channel or port 110, and the second connector member 104 may define a second connector channel 112. In some embodiments, the first connector channel 110 may be configured to receive the tip of the first syringe 20 to place the chamber of the first syringe body 22 in fluid communication with the first connector channel 110, and the second connector channel 112 may be configured to receive the tip of the second syringe 40 to place the chamber of the second syringe body 42 in fluid communication with the second connector channel 112. The first tubular member 102 and the second tubular member 104 may extend substantially parallel to each other to facilitate joint actuation of the syringes 20, 40, as discussed herein. In some embodiments, as illustrated in FIGS. 1-4, the first tubular member 102 and the second tubular member 104 may extend substantially parallel to a longitudinal axis of the adapter body 101.

The adapter body 101 may further include a first branch member 114, a second branch member 116, and a mixing member 118. The first port 102 may extend from the first branch member 114, and the first branch member 114 may connect the first port 102 to the mixing member 118. The second port 104 may extend from the second branch member 116, and the second branch member 116 may connect the second port 104 to the mixing member 118. The first branch member 114 may have a first branch channel 120 configured to receive the fluid flow from the first container 20 through the first connector channel 110, and the second branch member 116 may have a second branch channel 122 configured to receive the fluid flow from the second container 40 through the second connector channel 112. The first second branch channel 120 and the second branch channel 122 may be in communication with a first or upper portion of the mixing chamber 124. The first branch channel 120 and the second branch channel 122 may be angled relative to the longitudinal axis of the mixing member 118, adapter body 101 and/or mixing pin 160 to converge the fluid flow from the first syringe 20 and the second syringe 40 into the mixing member 118. The angle of at least one of the first branch channel 120 and the second branch channel 122 may be at least 90 degrees relative to the mixing member 118, adapter body 101 and/or mixing pin 160. As further illustrated, the angle of at least one of the first branch channel 120 and the second branch channel 122 may be about 120-160 degrees relative to the mixing member 118, adapter body 101 and/or mixing pin 160. The first branch channel 120 and the second branch channel 122 may form a Y-shape with the mixing member 118. This configuration of the branch channels 120, 122 and the ports 102, 104 may be favorable for manual mixing such that the syringes may be syringes 22, 42 are sufficiently spaced apart to be able to fit on the adapter body 101 while allowing joint actuation of the syringes 22, 42. However, other configurations may be applied in other applications. For example, the ports 102, 104 may be closer together when configured to attach to microtubes of a pump.

Figure 8:
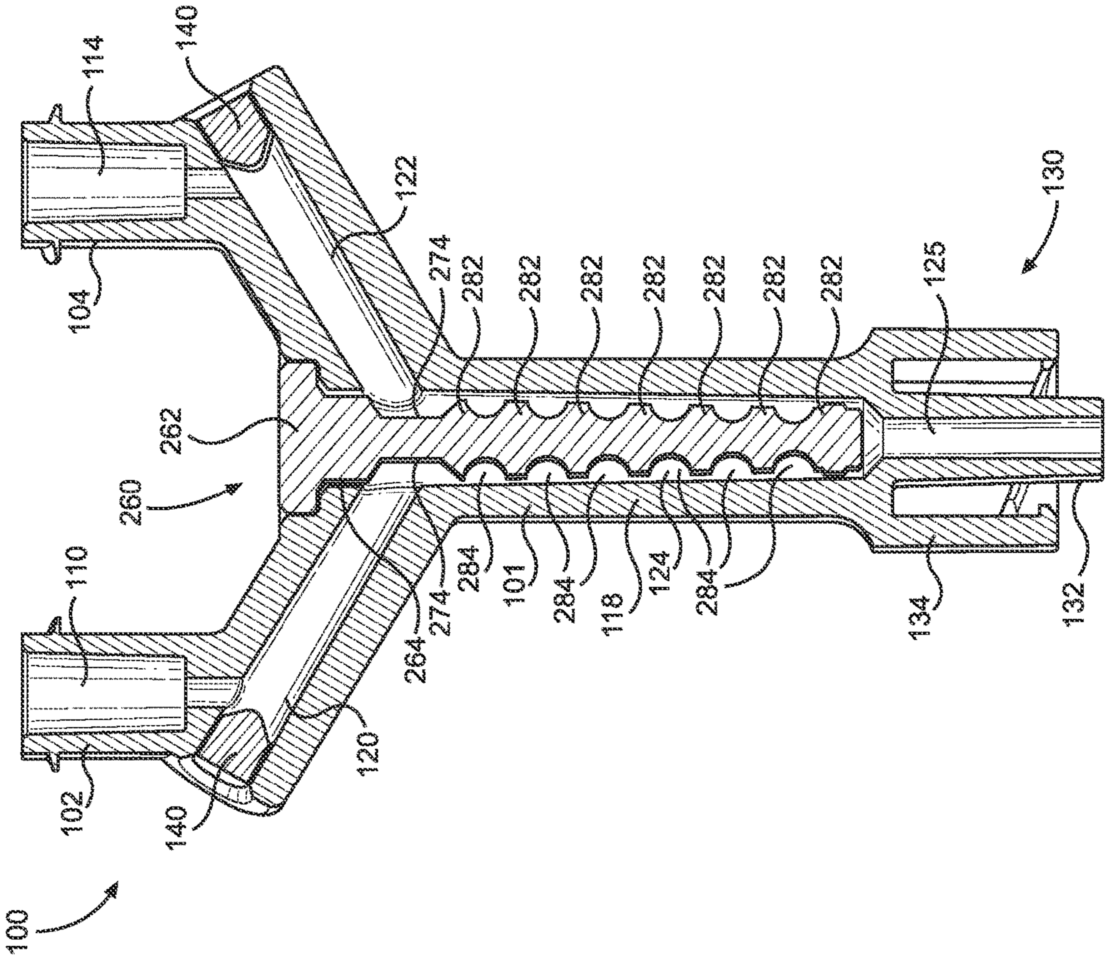
FIG. 8 illustrates a cross-sectional view of a second embodiment of a mixing pin in the adapter of the system of FIGS. 1-4.
Figure 11:
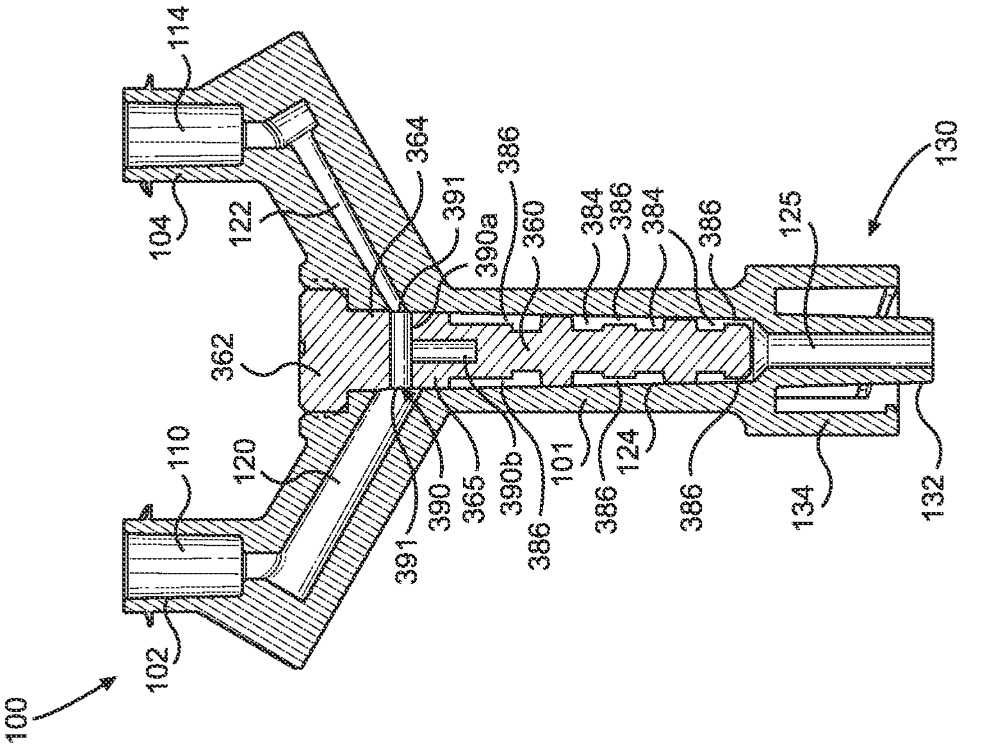
FIG. 11 illustrates a cross-sectional view of the third embodiments of the mixing pin of FIG. 10 in the adapter of FIGS. 1-4.
Figure 12:
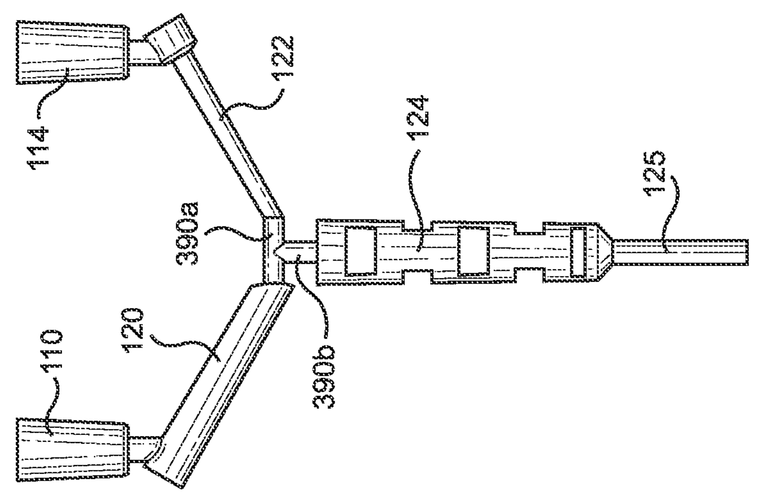
FIG. 12 illustrates a liquid volume cross-section of the adapter of FIG. 11.

The first branch channel 120 and the second branch channel 122 may be aligned with a central plane of the adapter body 101, and that the first branch channel 120 and the second branch channel 122 may direct the first and second substances to opposite faces of the mixing pin 160 and/or to create a collusion between the two fluid fluids for initial mixing. In some embodiments, the first branch channel 120 and the second branch channel 122 may have the same or substantially the same width or diameter (as illustrated in FIGS. 3 and 8) for applications where the same flow rate is desired for the first substance and the second substance. In some embodiments (as illustrated in FIGS. 11 and 12), the first branch channel 120 and the second branch channel 122 may have a different width or diameter for applications where differing flow rates are desired for the first substance and the second substance. For example (as further illustrated in FIGS. 11 and 12), the first branch channel 120 may have a larger width or diameter than the second branch channel 122. In some embodiments (as illustrated in FIGS. 2, 3 and 8), at least one or both of the first branch channel 120 and the second branch channel 122 may be formed with an open outer end, and the adapter 100 may include a plug 140 inserted into one or both of the branch members 114, 116 to seal the outer end of the respective branch channel 120, 122. In some embodiments (as illustrated in FIG. 11), at least one or both of the first branch channel 120 and the second branch channel 122 may have a closed outer end formed by the adapter body 101.

Figure 24:
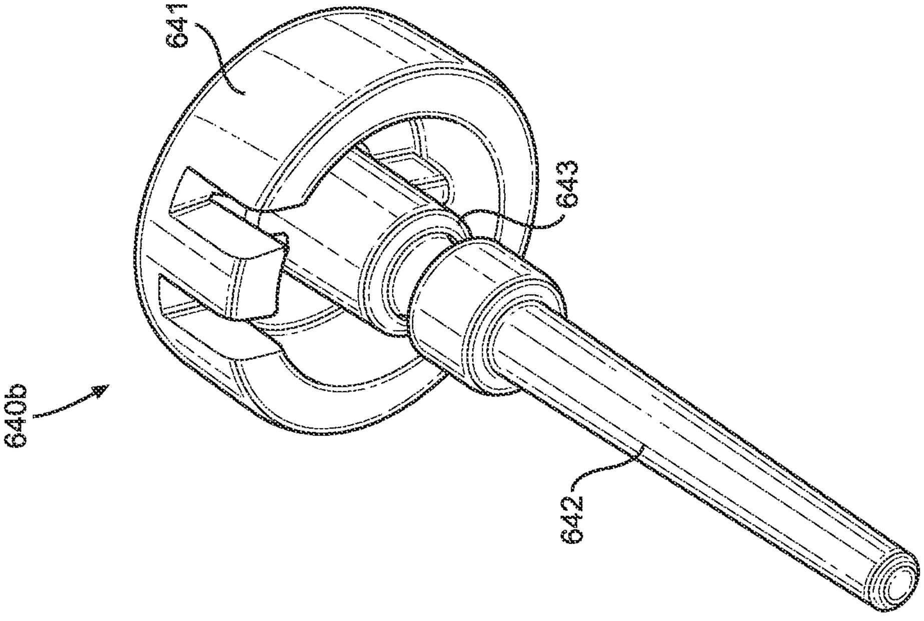
FIG. 24 illustrates an isometric view of a second plug of the adapter of FIGS. 15-19.
Figure 23:
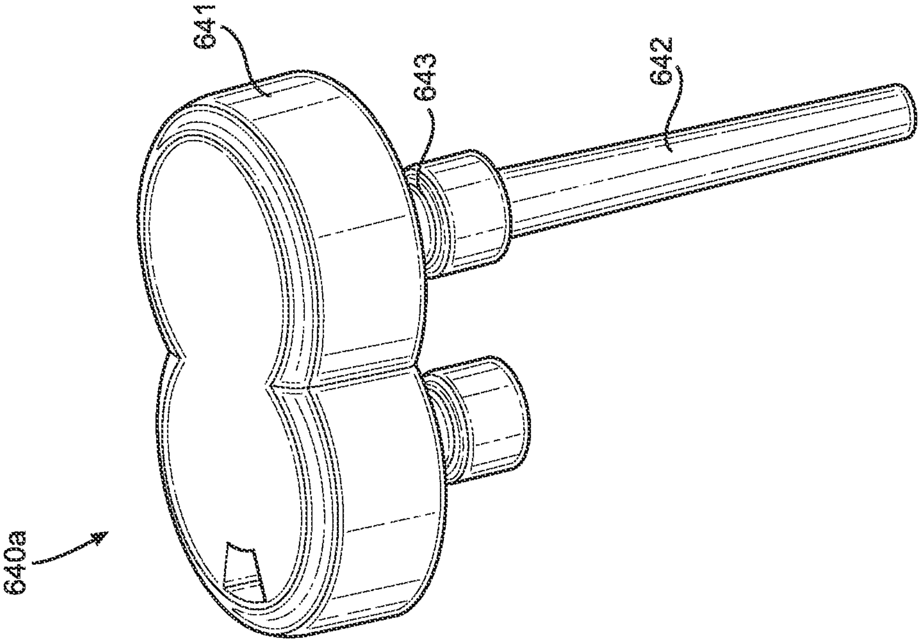
FIG. 23 illustrates an isometric view of a first plug of the adapter of FIGS. 15-19.

The plugs 140 may be removable, replaceable, interchangeable, and/or adjustable. The plugs 140 may facilitate manufacturing of the adapter body 101 by allowing the branch channels 120, 122 to be formed in the adapter body 101 through injection molding by insertion of a straight pin (not shown). The pin may be removed from the injector body 101 after formation through an opening, and the plugs 140 may be inserted to seal the opening in the branch channels 120, 122. In some embodiments, the plugs 140 may further extend through the branch channels 120, 122 to reduce the negative space in the branch channels 120, 122. For example, as illustrated in FIGS. 23 and 24, the plugs 140 may include a pin 642 that occupies space in the branch channels 120, 122 to reduce the negative space. In this manner, the inventors have found that the volume of the branch channels 120, 122 may be reduced or optimized without creating manufacturing complications in injection molding and/or 3d printing small components in the adapter 101. Furthermore, replacing and/or adjusting the plugs 140 may alter the inlet volume of one or both of the first connector channel 110 and/or the second connector channel 112. For example, the plugs 140 may be replaced with similar plugs 140 having different lengths and/or geometries to at least partially occlude one or both of the first connector channel 110 and/or the second connector channel 112. In some embodiments, the plugs 140 may be adjusted by being pushed or translated into the branch channels 120, 122 to at least partially occlude the first connector channel 110 and/or the second connector channel 112. In some embodiments, the plugs 140 may have an adjustable length such as being telescopic to at least partially occlude the first connector channel 110 and/or the second connector channel 112. Altering the inlet volume with the plugs 140 may adjust the fluid mixing ration and/or reduce dead volume of fluid left inside of the adapter body 101.

The mixing member 118 may have a mixing chamber 124 configured to receive the mixing pin 160. The mixing pin 160 may be removably insertable into the mixing chamber 124, for example, to allow interchangeability of the mixing pins 160, 260, 360, 460, 660, 760 depending on the intended application and/or substance. More specifically, the geometry of the mixing pins 160, 260, 360, 460, 660, 760 may affect characteristics of the pharmaceutical complex, such that the adapter 100 is configured to produce different types of LNPs based on the intended application. The adapter body 101 may have an opening 126 longitudinally aligned and in communication with the mixing chamber 124. The mixing pin 160 may be inserted through the opening 126 into the mixing chamber 124. The opening 126 may be on an upper portion of the body 101, between the first port 102 and the second port 104, and in communication with the upper portion of the mixing chamber 124. As further illustrated, the mixing pin 160 may include a flange 162 and the body 101 may include a countersunk recess 128 configured to receive the flange 162 when the mixing pin 160 is inserted into the mixing chamber 124. The opening 126 and/or the recess 128 may have a non-circular and/or axially asymmetric cross-section, and the flange 162 may have a non-circular and/or axially asymmetric cross-section corresponding to the opening 126 and/or the recess 128, in order to ensure that the mixing pin 160 is inserted into the mixing chamber 124 in a specific orientation. For example, the recess 128 and the flange 162 may each be non-circular, but bilaterally symmetric such as a substantially D-shaped cross-section to ensure that the mixing pin 160 is aligned properly with respect to the branch channels 120, 122. The cross-section of the recess 128 and the flange 162 may similarly be rectangular and/or oval shaped. In some embodiments (as illustrated in FIGS. 2-4), the recess 128 may be in a tubular member 129 extending upwardly from the mixing member 118 between the branch members 114, 116. As illustrated in FIG. 4, the tubular member 129 may have a width or diameter larger than a width of the mixing member 118 to receive the flange 162. In some embodiments (as illustrated in FIG. 8), the tubular member 129 may be omitted. The mixing pin 160 may be releasably secured in the mixing chamber 124 through a press-fit of the flange 162 inside of the recess 128. However, the mixing pin 160 may, additionally or alternatively, be releasably secured in the mixing chamber 124 by a snap-fit, a clip, a threaded connection, and/or a bayonet connection. The mixing chamber 124 may have a substantially uniform cross-section below the branch channels 120, 122 at least partially defining at least one microfluidic flow path and/or microfluidic channel for flow of the first substance and the second substance.

The mixing pin 160 may have a sealing portion 164 extending below the flange 162. The sealing portion 164 may have a width or diameter less than that of the flange 162 and be received in the upper portion of the mixing chamber 124 below the flange 162. The sealing portion 164 may have a shaped configured to seal the upper portion of the mixing chamber 124. The sealing portion 164 may be cylindrical.

The at least one flow path may be defined at least partially around the mixing pin 160 for mixing the first flow of the first substance and the second flow of the second substance through turbulent flow. The mixing pin 160 may include side faces on opposite sides, each directed at one of the branch channels 120, 122. Each of the side faces may be configured to divide the flow from one of the branch channels 120, 122 into two separate flow streams. For example, the side face of the mixing pin 160 directed at the first branch channel 120 may have first and second surfaces 166 joined at a first edge 168. The side face of the mixing pin 160 directed at the second branch channel 122 may have first and second surfaces 170 joined at a second edge 172. The mixing pin 160 may be inserted into the body 101, such that the first edge 168 and the second edge 172 are aligned with the lateral axis of the adapter body 101. The first edge 168 may be aligned with the first branch channel 120, and the second edge 172 may be aligned with the second branch channel 122, such that the edges 168, 172 may guide or divert the fluid flow from the branch channels 120, 122 around the mixing pin 160. The first edge 168 may divide the fluid flow from the first branch channel 120 to a first fluid path along a first of the surfaces 166 and a second fluid path along a second of the surfaces 166. Similarly, the second edge 172 may divide the fluid flow from the second branch channel 122 to a first fluid path along a first of the surfaces 170 and a second fluid path along a second of the surfaces 170. Each of the surfaces 166, 170 may be substantially flat, and the edges 168, 172 may be substantially sharp, blunt or slightly rounded to reduce disturbance of the pre-mixed flows from the branch channels 120, 122. The mixing pin 160 may have one or more lateral surfaces 174 on each side of the mixing pin 160. Each of the lateral surfaces 174 may extend between a pair of the surfaces 166, 170. As illustrated in FIG. 4, the lateral surfaces 174 may define a radial width less than the sealing portion 164 to define a space inside of the mixing chamber 124 for initial mixing of the flows of the first material and the second material. The lateral surfaces 174 may further allow for longitudinal movement of the fluid flows.

The at least one flow path may be tortuous. For example, the at least one flow path may be at least partially defined by at least one helical channel 176, 178. The at least one helical channel 176, 178 may include a first helical channel 176 and a second helical channel 178. The first helical channel 176 and the second helical channel 178 may have different orientations and/or extend in opposite helical directions. The at least one lateral surfaces 174 may extend below the surfaces/edges 166-172 and fluidly lead into at least one of the helical channel 176, 178. As illustrated, the mixing pin 160 may include a pair of lateral surfaces 174 each being in fluid communication with at least one of the first helical channel 176 and the second helical channel 178. However, in some embodiments, the mixing pin 160 may have a single lateral surface in fluid communication with both of the first helical channel 176 and the second helical channel 178. The first and second helical channels 176, 178 may intersect along the longitudinal length of the mixing pin 160 at a plurality of intersection points 180 on opposite lateral sides of the mixing pin 160 to generate turbulence and mix the first material and the second material. The first and second helical channels 176, 178 may form a double helix. As the constituents collectively pass through the mixing chamber 124, turbulence is induced by the tortuous path around the mixing pin 160, and the constituents therefore transition from an unmixed state to a mixed state. As the fluid passes through the intersection points 180, localized changes are induced in the fluid flow directions. Accordingly, as the fluid passes through the intersection points 180, the degree of turbulence (i.e., the Reynolds number) of the fluid flow is increased. As the degree of turbulence is increased, the parallelism of the components of fluid flow is reduced and therefore, the degree of mixing can be increased. Consequently, increasing the turbulence of the fluid in the mixing chamber can promote mixing of the components of that fluid. The pharmaceutical complex may thereby be formed by the first and second constituents collectively passing through the mixing chamber 124. The pharmaceutical complex may exit the first and second helical channels 176, 178 of the mixing pin 160 to pass through a bottom portion of the adapter body 101 and then exit the adapter 100 through a tip channel 125 into the recipient container 60.

As such, the geometry of the first and second helical channels 176, 178 may be chosen depending on the degree of turbulence required to achieve the required amount of mixing for any given application of the adapter 100. For example, the pitch of the first and second helical channels 176, 178 may be designed for the desired turbulence. The first and second helical channels 176, 178 may have a reduced pitch and a larger number of intersection points 180 for applications where a higher degree of turbulence is required to achieve desired mixing (for example where lipid nanostructures are to be formed). However, as the number of intersection points 180 increases, so too does the resistance to fluid flow through the mixing chamber 124. On the other hand, the first and second helical channels 176, 178 may have a steeper pitch and a smaller number of intersection points 180 for applications where a low degree of turbulence is required to achieve desired mixing or where a lower flow volatility is required to maintain certain physical properties of the constituents during mixing. As such, the pitch of the first and second helical channels 176, 178 may be chosen to provide a desired degree of mixing, while avoiding impractically high resistance for use with a manually driven syringe. Considering this, in one implementation the inventors have found that an arrangement of 8-40 intersection points 180, for example 8-12 intersection points 180, is particularly useful for producing mRNA-LNP or RNA-LNP compositions. However, as the reader will understand, different numbers of bends may be used in different contexts.

The first and second helical channels 176, 178 may be formed of grooves or indents in an outer surface of the mixing pin 160. The first and second helical channels 176, 178 may be a microfluidic path to reduce the influence of volumetric forces on the fluid flow. The first and second helical channels 176, 178 may have a width ranging from about 100 μm to about 1000 μm and/or a depth of about 100 μm to about 1000 μm. However, the width and/or depth is preferably about 400 μm to about 1000 μm to facilitate manufacturing. In a preferred embodiment, the inventors have found consistent and rapid formation of the pharmaceutical complex (e.g., mRNA-LNPs) when the width and/or depth of the first and second helical channels 176, 178 are about 400 μm to about 600 μm. Smaller channels may be used to increase the velocity of the fluid flowing through the mixing chamber 124, which may further improve mixing. At these scales the effect of tortuous path on the turbulence of the fluid may be amplified and mixing is increased as compared to fluid paths with larger channels. The higher the velocity of the fluid through the mixing chamber 124, the higher the amount of turbulence induced and therefore the higher the degree of turbulence induced across the mixing chamber 124. However, the smaller channels increase pressure and resistance. The three-dimensional flow path or channels as disclosed allow for optimal formation of the pharmaceutical complex by increasing the overall flow volume through the adapter 100 and reducing the necessary pressure applied by the containers 20, 40.

The adapter body 101 may have a third port or connector member 130 at a bottom portion of the mixing member 118. The third connector member 130 may be a male Luer connector including a tip 132 and a sleeve 134 configured to attach to the recipient container 60 via the vial adapter 70. The tip 132 may have the tip channel 125 in communication with a second or bottom portion of the mixing chamber 124. The tip 132 may be received in the connector 74 of the vial adapter 70 and the sleeve 134 may be threadedly connected to an outer surface of the connector 74 in a Luer connection. The third connector member 130 may be a male Luer connector configured to connect to a female Luer connector of the vial adapter 70. However, the connector member 130 may, additionally or alternatively, connect to the recipient container 60 with other types of connections such as a snap-fit and/or a press-fit. The tip channel 125 may provide passage of the mixed composition from the mixing chamber 124 to the recipient container 60.

The adapter body 101 may be formed of a polymer, a metal, and/or a glass. In a preferred embodiment, the adapter body 101 may be formed in a single, unitary piece (for example through injection molding or 3D printing) including the first port 102, the second port 104, the mixing member 118, the tubular member 129, and/or the connector member 130. Alternatively, the adapter body 101 may be formed of two pieces (e.g., halves) and be secured or fused together, each of which can be a metal, a polymer, or a glass. To increase the ease with which the fluid to be mixed flows through the adapter 100, low surface energy materials may be used for at least a portion of the adapter body 101. For example, the adapter body 101 and/or the mixing pin 160 may be formed of or coated with a low surface energy material such as ethylene tetrafluoroethylene (ETFE). Other low surface energy materials may also be used, for example fluoropolymer materials other than ETFE. Alternatively, the at least one path may be treated to reduce the surface energy. Forming the sides of the channels of low surface energy materials can reduce loss of constituents across the mixing chamber 124 during use and therefore may enable the adapter 100 to operate more efficiently. Although a low surface energy material may provide additional advantages in some embodiments, it is an optional feature of the present disclosure.

Figure 9:
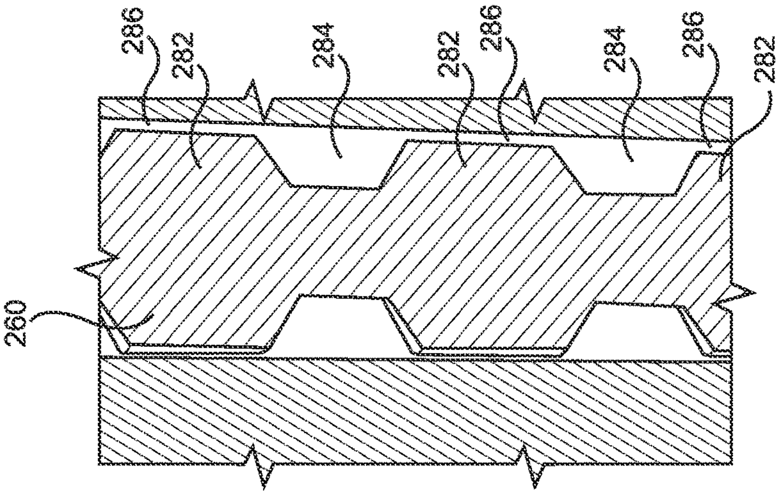
FIG. 9 illustrates a cross-sectional view of the adapter of FIG. 8.

FIGS. 8 and 9 illustrate a second embodiment of a mixing pin 260 in the adapter 100 of FIGS. 1-4. The disclosure of the mixing pin 160 is expressly incorporated herein, unless otherwise indicated. As further discussed herein, the mixing pin 260 may be inserted into the mixing chamber 124 of the adapter 100 with the flange 262 received in the recess 128 and the sealing portion 264 sealing the upper portion of the mixing chamber 124. The first substance may be introduced into the first port 102, and the second substance may be introduced into the second port 104. The first substance may pass through the first connector channel 110 and the first branch channel 120, and into the mixing chamber 124. The second substance may pass through the second connector channel 114 and the second branch channel 122, and into the mixing chamber 124. The mixing pin 260 may include a plurality of radial protrusions 282 defining a first channel 284 longitudinally therebetween and positioned radially between the mixing pin 260 and the inner wall of the adapter body 101. The protrusions 282 may extend at least partially around the circumference of the mixing pin 260 and create at least one microfluidic flow path. For example, the protrusions 282 may extend uniformly around the entire circumference of the mixing pin 260 to create a constriction in the mixing chamber 124. In some embodiments, the protrusions 282 may have a substantially uniform outer dimension (e.g., circumference) slightly smaller than an inner dimension (e.g., circumference) of the inner wall of the adapter body 101. A second channel 286 may be defined by a gap between the outer dimension of the protrusion 282 and the inner wall of the adapter body 101 to induce the turbulent flow for favorable mixing of the materials. The second channel 286 may be smaller than the first channels 284 creating the constriction. In some embodiments, the mixing pin 260 may create a microfluidic path having at least two alternating dimensions including the first channels 284 and the second channels 286, such that the cross-sectional area of the path varies along its length. By including at least two alternating inner dimensions, the fluid flowing through the mixing chamber 124 may undergo repeated acceleration and deceleration, thus inducing further turbulence in the mixing chamber 124. In a preferred embodiment, the first channels 284 may have a diameter or width of about 250 μm to about 1000 μm, and the second channels 286 may have a width or diameter of about 50 μm to about 200 μm.

Figure 10:
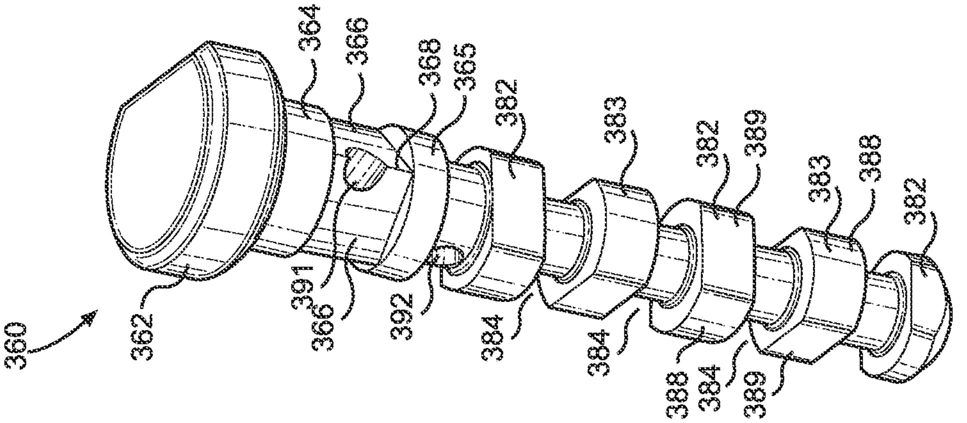
FIG. 10 illustrates an isometric view of a third embodiments of a mixing pin of the system of FIGS. 1-4.

FIGS. 10-12 illustrate a third embodiment of a mixing pin 360 of the system 10 of FIGS. 1-4. The disclosure of the mixing pins 160 and/or 260 is expressly incorporated herein, unless otherwise indicated. As further discussed herein, the mixing pin 360 may be inserted into the mixing chamber 124 of the adapter 100 with the flange 362 received in the recess 128 and the sealing portion 364 sealing the upper portion of the mixing chamber 124. The first substance may be introduced into the first port 102, and the second substance may be introduced into the second port 104. The first substance may pass through the first connector channel 110 and the first branch channel 120, and into the mixing chamber 124. The second substance may pass through the second connector channel 114 and the second branch channel 122, and into the mixing chamber 124.

The at least one microfluidic flow path may be tortuous. The at least one flow path may be through, longitudinally along, and/or circumferentially around the mixing pin 360. As further illustrated, the mixing pin 360 may include at least one first protrusion 382 and at least one second protrusion 383 disposed along the longitudinal length of the mixing pin 360. The at least one first protrusion 382 and the at least one second protrusion 383 may be longitudinally spaced apart by first channels 384 defined by a reduced width or diameter portion of the mixing pin 360. Each of the at least one first protrusion 382 and the at least one second protrusion 383 may have lateral symmetry. For example, each of the protrusions 382, 383 may include at least one first surface 388 configured to forming a seal against an inner surface of the adapter body 101 when inserted into the mixing chamber 124, and at least one second surface 389 forming a second channel 386 formed by a radial gap respect to the inner surface of the mixing member 118 and configured to allow longitudinal passage of the flow through the mixing chamber 124 and generate mixing between opposing circumferential flows around the first channels 384 of the mixing pin 360. The at least one first surface 388 may be curved to approximate the inner wall of the adapter body 101, and the at least one second surface 389 may be flat to form the second channel 386 with respect to the inner wall of the adapter body 101. For example, the protrusions 382, 383 may have a substantially rectangular geometry having a first width defining a pair of the first rounded side surfaces 388 and a second width defining a pair of the second straight side surfaces 389, where the first width is greater than the second width. However, it is also contemplated that one or more or all of the protrusions 382, 383 may define only a single second surface 389 and thus only a single second channel 386, with the remaining circumference being defined by the curved first surface 388. Thus, the second channels 386 may be smaller than the first channels 384. For example, the second channels 386 may be in about 250 μm to about 1000 μm, and the grooves 384 may be about 50 μm-200 μm.

The first channels 384 and the second channels 386 may collectively define the at least one channel along the longitudinal length of the mixing pin 360 to provide the at least one flow path. As further illustrated in FIGS. 10 and 11, the first and second protrusions 382, 383 may be radially offset such that the second channels 386 are not aligned longitudinally along the mixing chamber. The first and second protrusions 382, 383 may alternate. For example, in a preferred embodiment (as illustrated in FIG. 10), longitudinally adjacent first and second protrusions 382, 383 may be offset by 90 degrees and may be longitudinally arranged in the following order: one first protrusion 382, followed by one second protrusion 383, followed another first protrusion 382, followed by another second protrusion 383, and so on. The nonalignment of the second channels 386 may enhance mixing of the materials by requiring the material to travel circumferentially around the mixing pin 360 in order to pass the at least one first surface 388, and opposing fluid flows would converge at the second channels 386 along the mixing pin 360. However, it is contemplated that additional protrusions of other arrangements may be provided.

As further illustrated, the mixing pin 360 may define a closed channel or lumen 390 through an upper portion below the sealing portion 364 configured to receive the fluid flow, perform initial mixing, and/or to introduce the fluid flow into the at least one path of the mixing pin 360 and the mixing chamber 124. The lumen 390 may have a pair of entry openings 391 each in communication with one of the branch channels 120, 122. The lumen 390 may have a first segment **390*a* extending transverse to the longitudinal axis of the mixing pin 360, where the opposing fluid flows from the branch channels 120, 122 converge for initial mixing. The lumen 390 may a second segment 390*b* extending along the longitudinal axis of the mixing pin. The fluid may travel though the second segment 390*b*, and through a second transverse segment (not shown), and out through one or more exit openings 392 into the at least one path defined by the first and second protrusions 382, 383. The lumen 390 may have a pair of exit openings 392, each longitudinally aligned with one of the first side surfaces 388 necessitating circumferential fluid flow to pass through one of the first channels 384. The entry openings 391 may each extend through an edge 368 formed by adjacent surfaces 366. A first edge 368 may be aligned with the first branch channel 120, and a second edge (not shown) may be aligned with the second branch channel 122. The surfaces 366 may extend to an outer diameter of the mixing pin 360 contacting an inner surface of the mixing chamber 124. A second sealing portion 365 may be below the surfaces 366 and have a shape configured to seal around the mixing pin 360 forcing passage through the entry openings 391. The second sealing portion 365** may be cylindrical.

Figure 13:
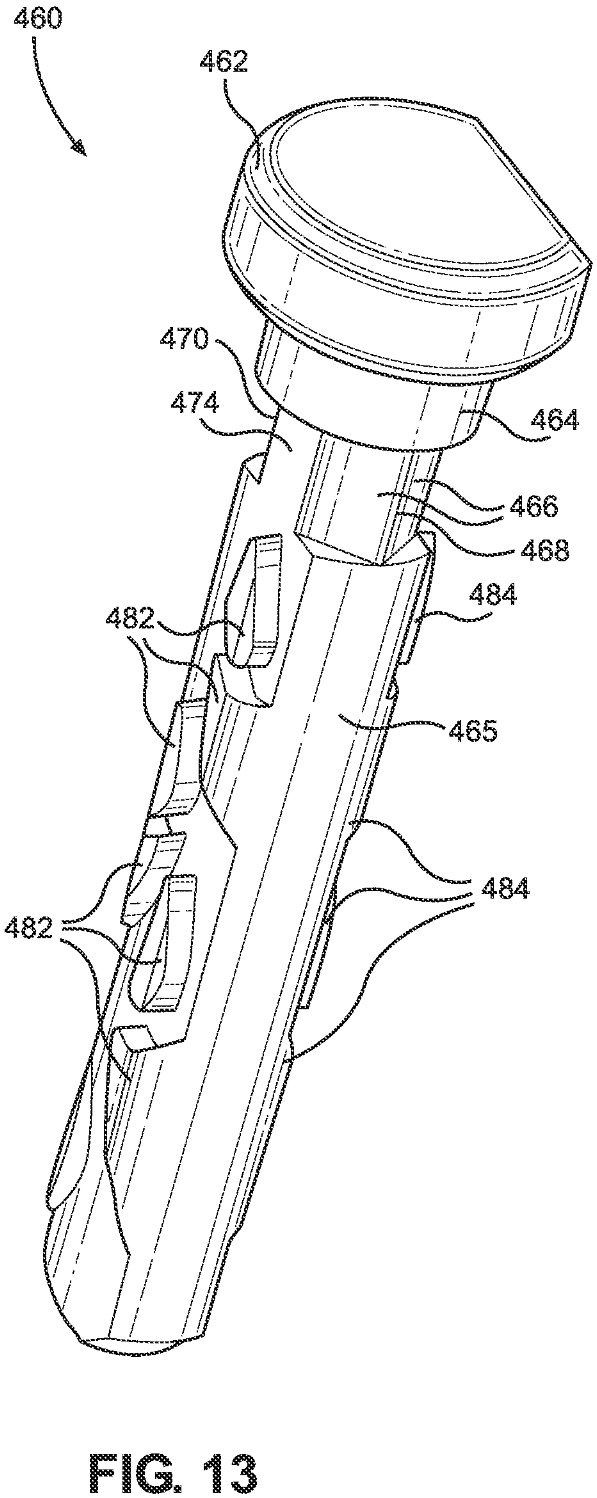
FIG. 13 illustrates an isometric view of a fourth embodiment of a mixing pin of the system of FIGS. 1-4.

FIG. 13 illustrates a fourth embodiment of a mixing pin 460 of the system 10 of FIGS. 1-4. The disclosure of the mixing pins 160, 260, and/or 360 is expressly incorporated herein, unless otherwise indicated. As further discussed herein, the mixing pin 460 may be inserted into the mixing chamber 124 of the adapter 100 with the flange 462 received in the recess 128 and the sealing portion 464 sealing the upper portion of the mixing chamber 124. The first substance may be introduced into the first port 102, and the second substance may be introduced into the second port 104. The first substance may pass through the first connector channel 110 and the first branch channel 120, and into the mixing chamber 124. The second substance may pass through the second connector channel 114 and the second branch channel 122, and into the mixing chamber 124.

At least one path may be defined at least partially around the mixing pin 460 for mixing the first flow of the first substance and the second flow of the second substance through turbulent flow. The mixing pin 460 may include side portions facing one of the branch channels 120, 122 configured to divide the flow from at least one of the branch channels 120, 122 into two separate flow streams. For example, the side portion of the mixing pin 460 facing the first branch channel 120 may have first and second surfaces 466 joined at a first edge 468. Additionally or alternatively, the side portion of the mixing pin 460 facing the second branch channel 122 may have first and second surfaces 470 joined at a second edge (not shown). The first edge 468 and second edge may be aligned with the lateral axis of the mixing pin 460 and/or the lateral axis of the body 101. The first edge 468 may align with the first branch channel 120, and the second edge 172 may align with the second branch channel 122, such that the edges 468 may guide or divert the fluid flow from the branch channels 120, 122 around the mixing pin 460. The first edge 468 may divide the fluid flow from the first branch channel 120 to a first fluid path along a first of the surfaces 466 and a second fluid path along a second of the surfaces 466. Similarly, the second edge may divide the fluid flow from the second branch channel 122 to a first fluid path along a first of the surfaces 470 and a second fluid path along a second of the surfaces 470. Each of the surfaces 166, 170 may be substantially flat, and the edges 468 may be substantially sharp, blunt or slightly rounded to reduce disturbance of the flows from the branch channels 120, 122. The mixing pin 460 may have one or more lateral surfaces 474 on each side of the mixing pin 460. Each of the lateral surfaces 474 may extend between a pair of the surfaces 466, 470. As illustrated, the lateral surfaces 474 may define a radial width less than the sealing portion 464 to define a space inside of the mixing chamber 124 for initial mixing of the flows of the first material and the second material.

The least one path of the mixing pin 460 may include a first path along a first side of the mixing pin 460 and a second path along a second side of the mixing pin 460. A first of the lateral surfaces 474 may extend downwardly and define an inner surface of the first path, and a second of the lateral surfaces 474 may extend downwardly and define an inner surface of the second path. The lateral surfaces 474 may be on opposing sides of the mixing pin 460 and be separated by first and second convex sealing surface 465. The sealing surfaces 465 may abut the inner surface of the mixing chamber 124 preventing fluid passage between the first and second paths. The sealing surface 465 may extend from the edges 468 at an upper portion of the mixing chamber 124 to a lower portion of the mixing chamber 124, separating the first fluid path and the second fluid path into two distinct fluid paths. The first fluid path may include a plurality of first protrusions 482 extending laterally or raised from the first lateral surface 474. The plurality of first protrusions 482 may form impediments and flow constrictions to the fluid path generating turbulence to producing mixing in the first fluid path. Similarly, the second fluid path may include a plurality of second protrusions 484 extending laterally or raised from the second lateral surface 474. The plurality of second protrusions 484 may form impediments and flow constrictions to the fluid path generating turbulence to producing mixing in the second fluid path. For example, the protrusions 482, 484 may divide each of the fluid paths and/or form narrow gaps therebetween to constrict the fluid flow causing local accelerations, intersection points, and/or eddies in the fluid flow. Each of the protrusions 482, 484 may have an angled or V-shaped proximal portion that divides the fluid flow. One of the divided stream may follow a path formed between a rounded distal portion of the protrusion 482, 484 and a concave portion of the distally adjacent protrusion 482, 484 and collide with the other divided stream to produce eddies and turbulence. The protrusion 482, 484 of each of the lateral sides 474 may form a modified tesla valve to provide turbulent flow with improved mixing. The first and second paths may join at a lower end of the mixing chamber 124 and/or in the tip channel 125 to be passed into the recipient container 60.

Figure 14:
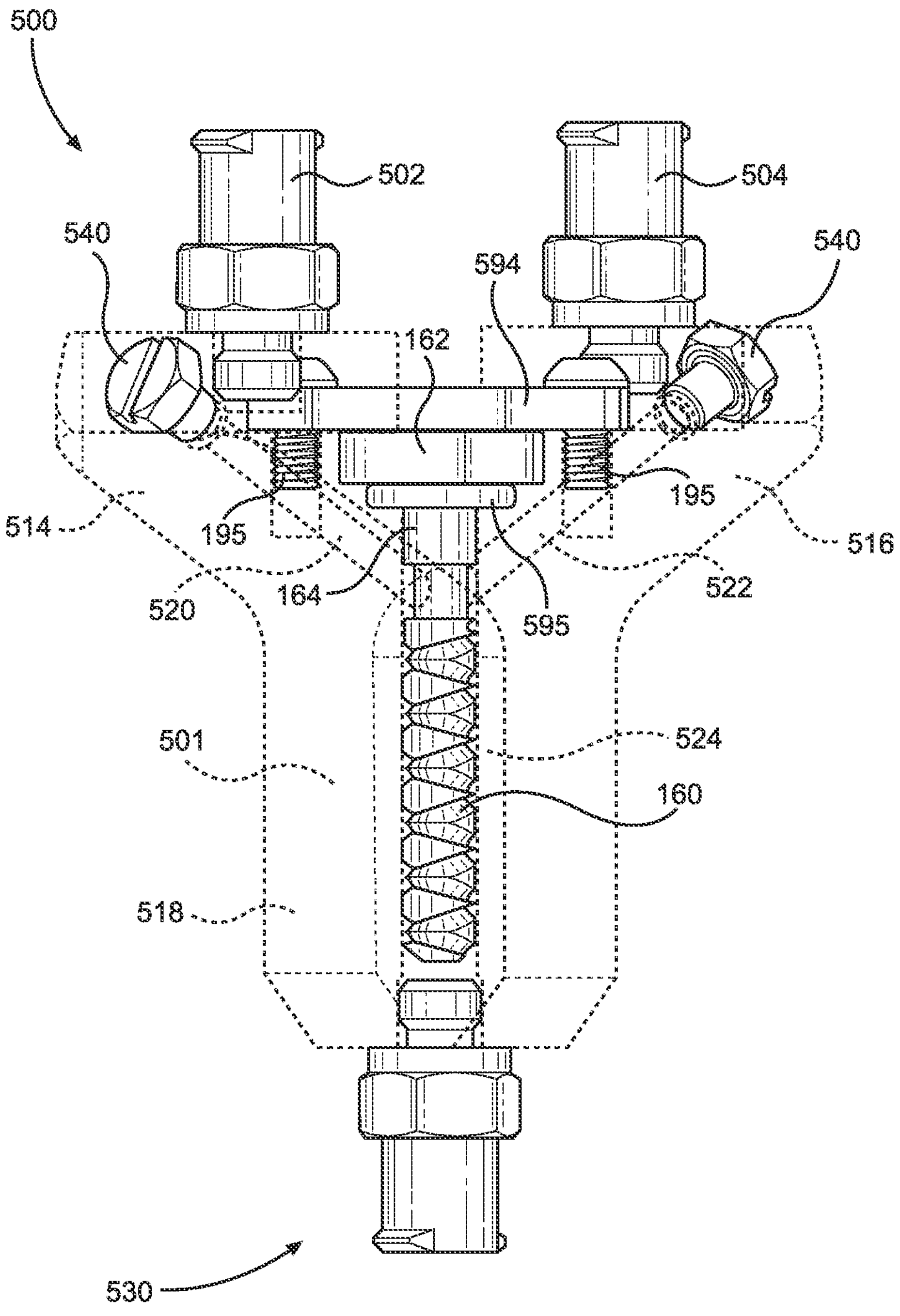
FIG. 14 illustrates a partially transparent view of a second embodiment of an adapter of the system of FIGS. 1-4.

FIG. 14 illustrates a second embodiment of an adapter 500 of the system 10 of FIGS. 1-4. The adapter 500 may include a body 501 having a first port 502 configured to attach to the syringe connector 26 of the first container 20 and a second port 504 configured to attach to the syringe connector 46 of the second container 40. The adapter body 501 may further include a first branch member 514, a second branch member 516, and a mixing member 518. The first port 502 may extend from the first branch member 514, and the first branch member 514 may connect the first port 502 to the mixing member 518. The second port 504 may extend from the second branch member 516, and the second branch member 516 may connect the second port 504 to the mixing member 518. The first branch member 514 may have a first branch channel 520 configured to receive the fluid flow from the first syringe 20 through the first port 502, and the second branch member 516 may have a second branch channel 522 configured to receive the fluid flow from the second syringe 40 through the second port 504. The first branch channel 520 and the second branch channel 522 may be angled relative to the longitudinal axis of the adapter body 501 and/or mixing pin 160 to converge the fluid flow from the first syringe 20 and the second syringe 40 into the mixing member 518. The angle of at least one of the first branch channel 520 and the second branch channel 522 may be greater than 90 degrees relative to the mixing chamber 524, adapter body 501 and/or mixing pin 160. As further illustrated, the angle of at least one of the first branch channel 520 and the second branch channel 522 may be about 120-160 degrees relative to the mixing chamber 524, adapter body 501 and/or mixing pin 160. However, other configurations may be applied in other applications, as discussed herein. The first branch channel 520 and the second branch channel 522 may be aligned with a central plane of the adapter body 501, such that the first branch channel 520 and the second branch channel 522 directs the first and second substances to opposite faces of the mixing pin 160. The first branch channel 520 and the second branch channel 522 may form a Y-shape with the mixing member 518. The disclosure of the adapter 100 is expressly incorporated herein its entirety, unless otherwise indicated. Although illustrated with the mixing pin 160, the adapter 500 may include any of the other disclosed mixing pins.

As further illustrated, the adapter body 501 may be formed separately from at least one or all of the ports 102, 104, 130. For example, the adapter body 501 may be formed through injection molding or 3d printing, and the ports 102, 104, 130 may be formed separately and fitted to the adapter body 501 through a press fit, a threaded fit, and/or a snap fit. The adapter 500 may further include a retainer 594 configured to be applied to the adapter body 501 to secure the mixing pin 160 in the mixing chamber 124. As illustrated, the retainer 594 may include a plate secured to the adapter body 501 with one or more fasteners 195 that may be threaded. However, the retainer 594 may, additionally or alternatively, include other structures such as a clip, a sliding or pivoting door, and the like. The adapter 500 may further include a sealing member 595 configured to seal the proximal end of the mixing chamber 524. The sealing member 595 may be a separate component from the mixing pin 160. For example, sealing member 595 may be an elastomeric O-ring disposed around a proximal portion of the mixing pin 160, such as at the sealing portion 164. The adapter 500 may include plugs 540 inserted into one or both of the branch members 514, 516 to seal the outer end of the respective branch channel 520, 522. The plugs 540 may have an interface to receive a distal end effector of a tool for adjusting and/or removal. For example, as illustrated, the plugs 540 may include one or more slots that may mate with a flat head, Philips head, Torx head, and/or hex head effector of a tool or screwdriver.

FIGS. 15-24 illustrates a third embodiment of an adapter 600 of the system 10 of FIGS. 1-4. As illustrated, the adapter 600 may include a body 601 having a first port or connector member 602 configured to attach to the syringe connector 26 of the first container 20 and a second port or connector member 604 configured to attach to the syringe connector 46 of the second container 40. The adapter 600 may include a mixing member 618 that receives a mixing pin 660. The disclosure of the adapter 100, 500 and/or the mixing pin 160, 260, 360, 460 is expressly incorporated herein its entirety, unless otherwise indicated.

The first port 602 may be configured to be received by the first syringe connector 26 and have an external thread 606 configured to threadably engage the internal threads of the first syringe connector 26. The second connector 604 may be configured to be received by the second connector 46 and have an external thread 608 around the second tubular member 608 configured to threadably engage the internal threads of the second syringe connector 46. For example, the first port 602 may be a female Luer connector, and the connector 26 of the first syringe 20 may be a male Luer connector. However, the ports 602, 604 may, additionally or alternatively, connect to the containers 20, 40 with other types of connections such as a snap-fit, friction-fit and/or a press-fit. The adapter 600 may be configured to connect to any number of the first and second containers 20, 40, the adapter 100 may have an equal number of ports 602, 604 for connecting to each of the containers 20, 40 accordingly. Furthermore, one or more of the ports 602, 604 may include a one-way valve (not shown) to allow fluid flow from the containers 20, 40 into the adapter 600, and to restrict or substantially prevent fluid flow out of the adapter 600 back to the respective container 20, 40.

Figure 15:
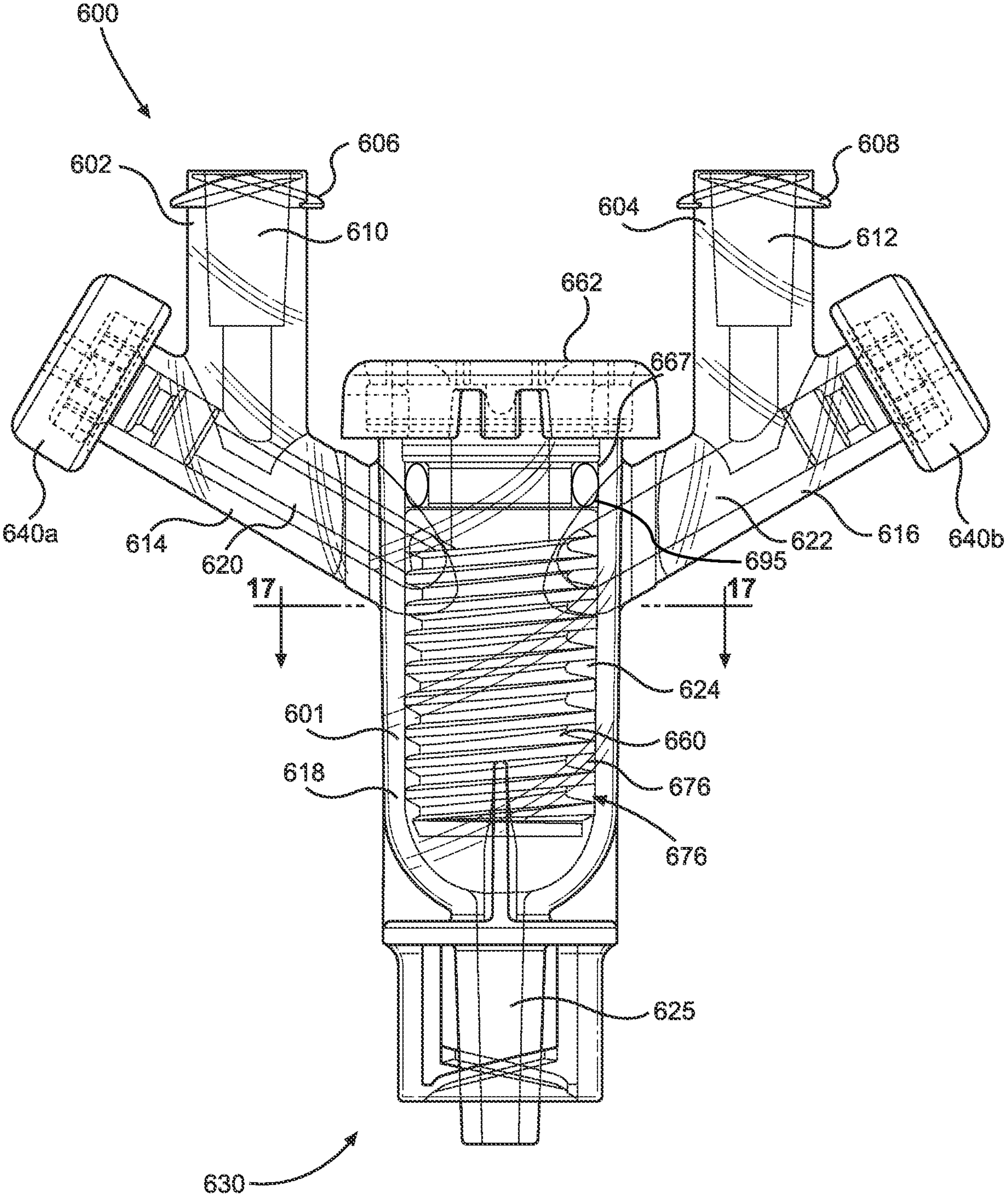
FIG. 15 illustrates a partially transparent view of a third embodiment of an adapter of the system of FIGS. 1-4.

The first port 602 may define a first connector channel 610, and the second connector member 604 may define a second connector channel 612. The first connector channel 610 may be configured to receive the tip of the first syringe 20 to place the chamber of the first syringe body 22 in fluid communication with the first connector channel 610, and the second connector channel 612 may be configured to receive the tip of the second syringe 40 to place the chamber of the second syringe body 42 in fluid communication with the second connector channel 612. The first port 602 and the second port 604 may extend substantially parallel to each other to facilitate joint actuation of the syringes 20, 40. In some embodiments, as illustrated in FIG. 15, the first port 602 and the second port 604 may extend substantially parallel to a longitudinal axis of the adapter body 601.

Figure 16:
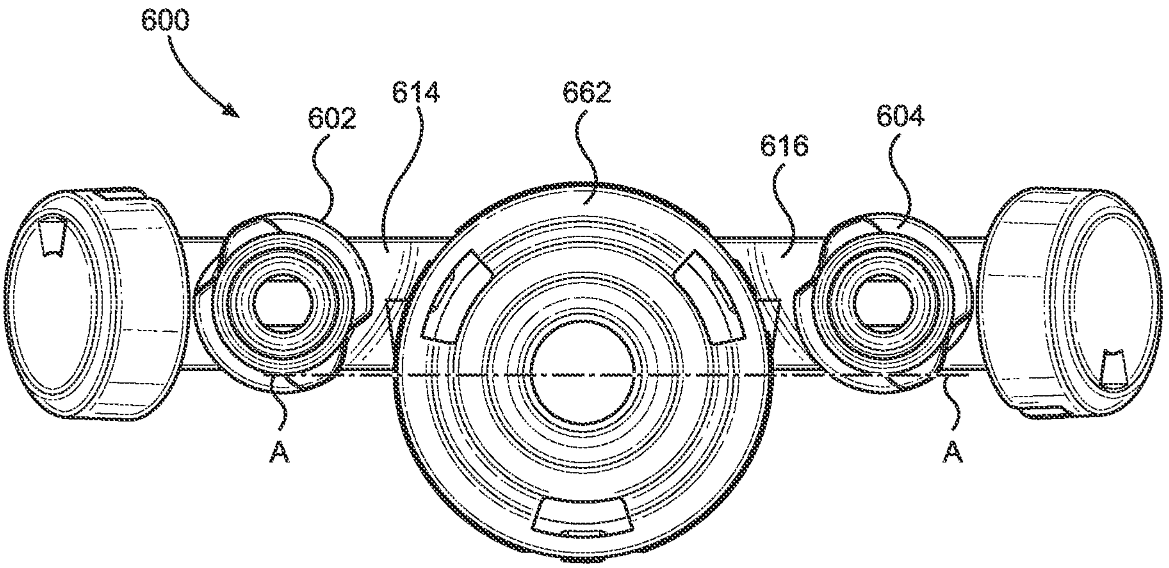
FIG. 16 illustrates a longitudinal view of the adapter of FIG. 15.
Figure 17:
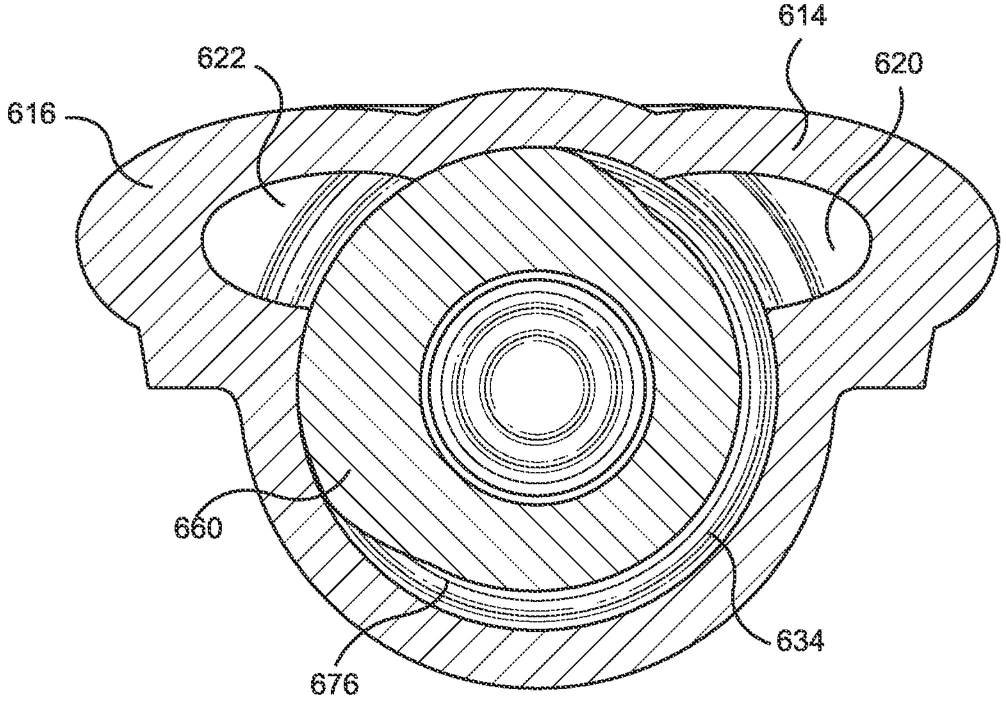
FIG. 17 illustrates a cross-sectional view of the adapter of FIGS. 15 and 16.
Figure 18:
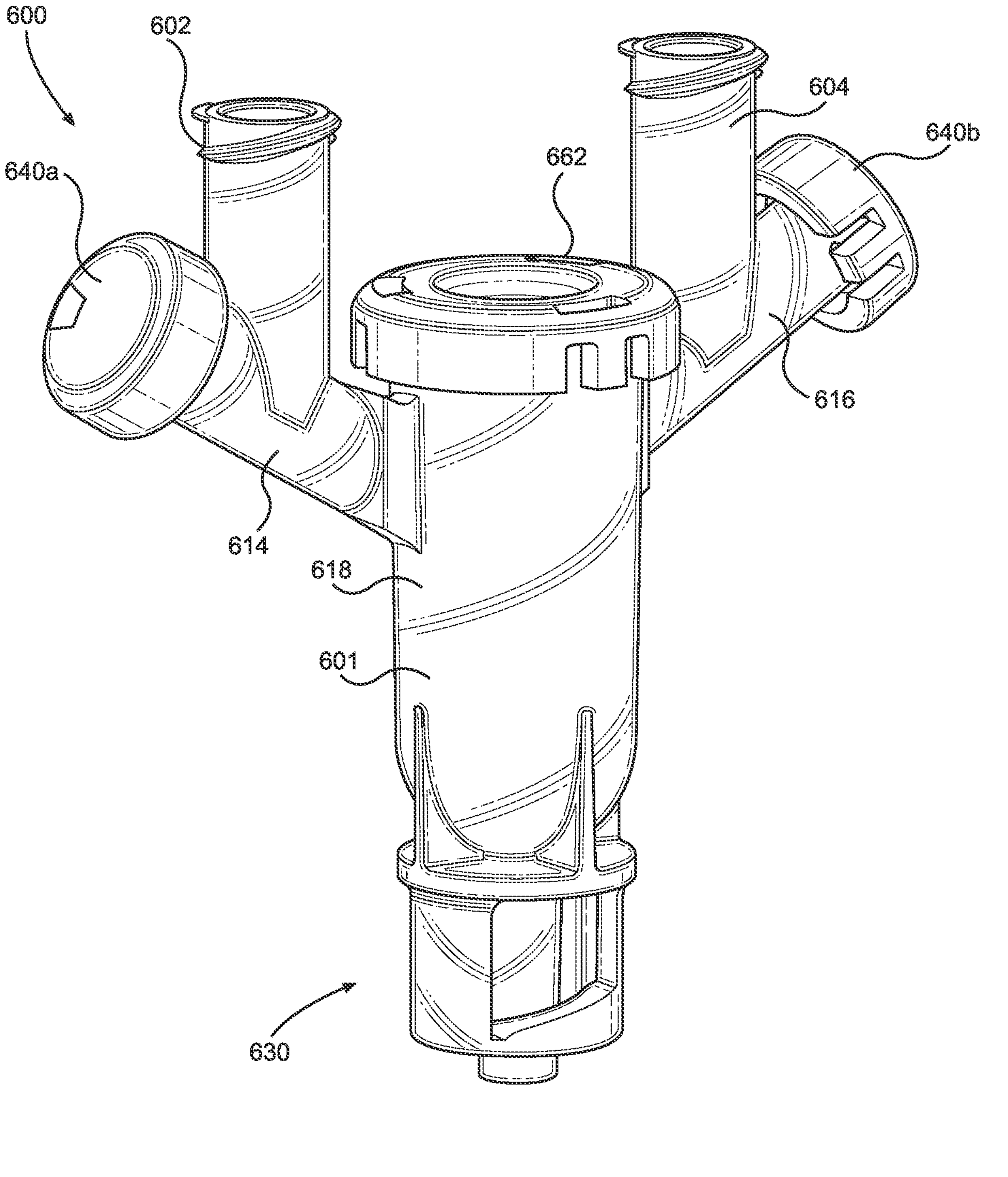
FIG. 18 illustrates an isometric view of the adapter of FIGS. 15-17.
Figure 19:
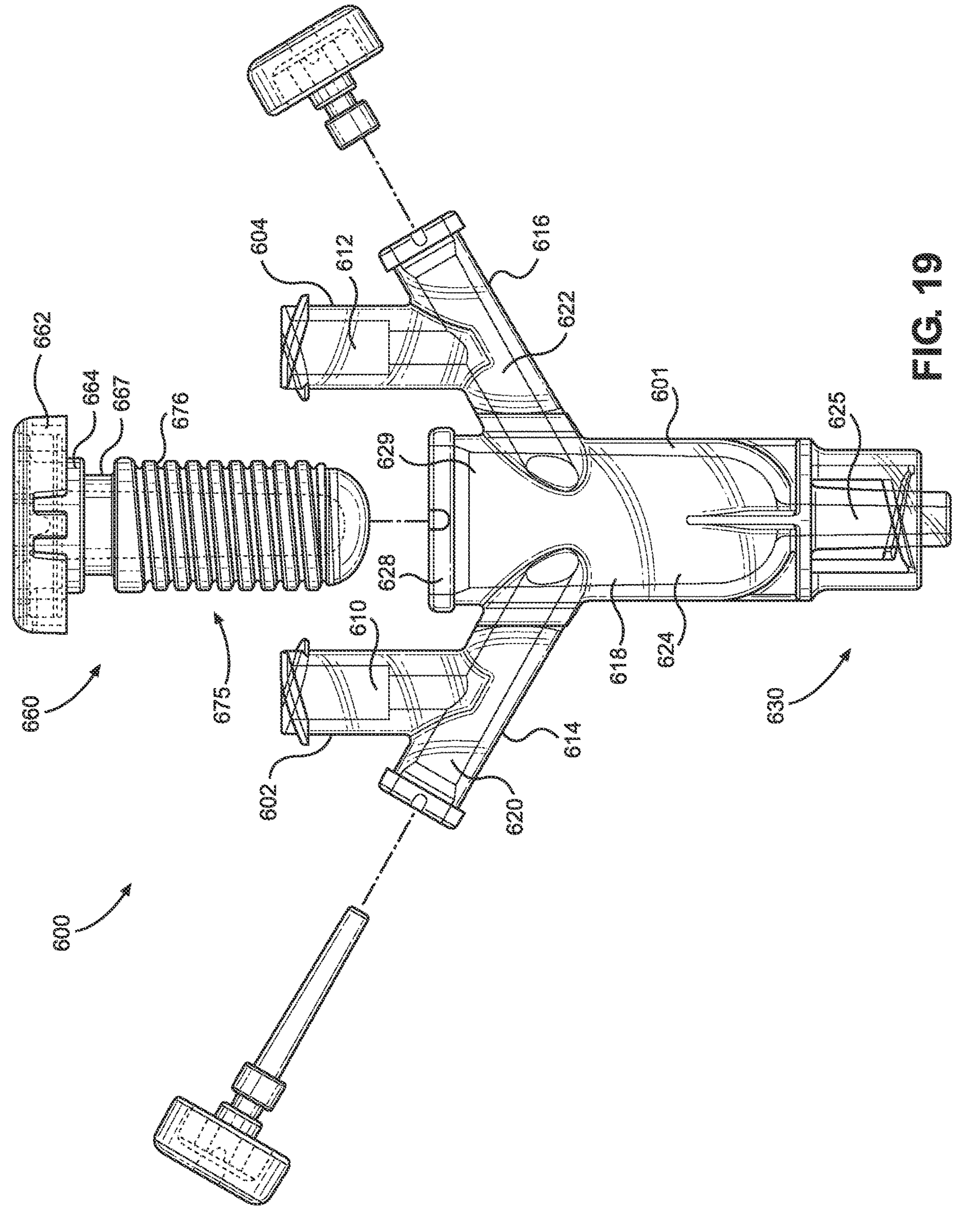
FIG. 19 illustrates an exploded view of the adapter of FIGS. 15-18.
Figure 20:
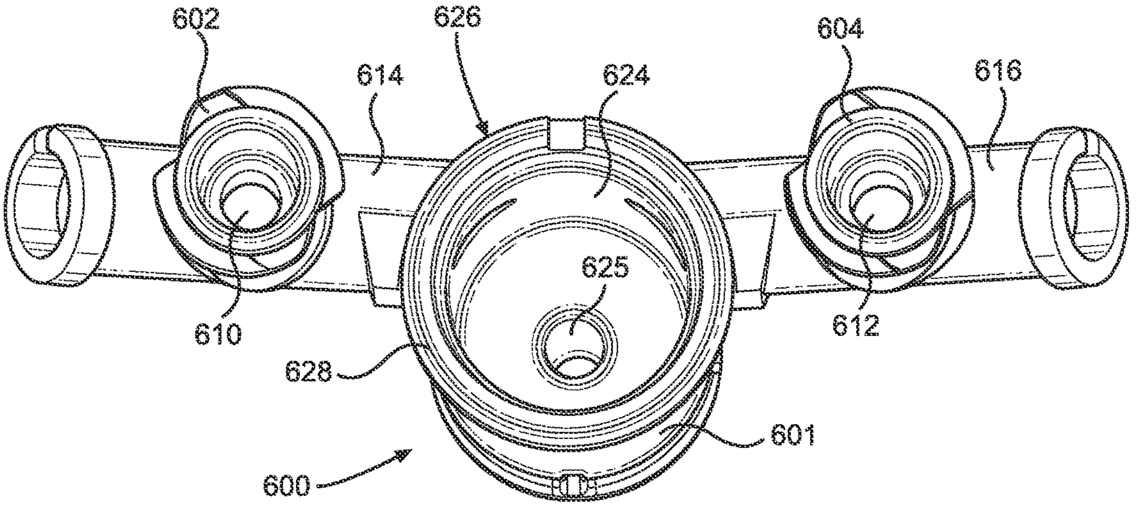
FIG. 20 illustrates an isometric view of the adapter of FIGS. 15-19.
Figure 21:
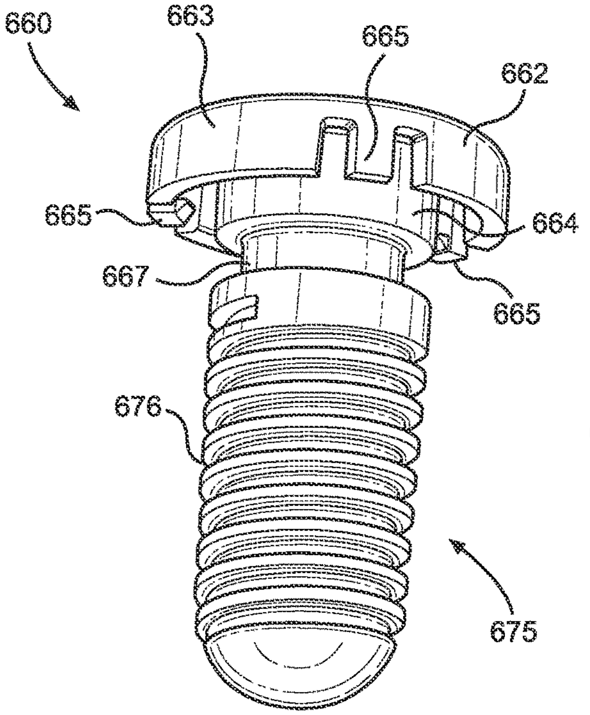
FIG. 21 illustrates a first isometric view of the mixing pin of FIGS. 15-17 and 19.
Figure 22:
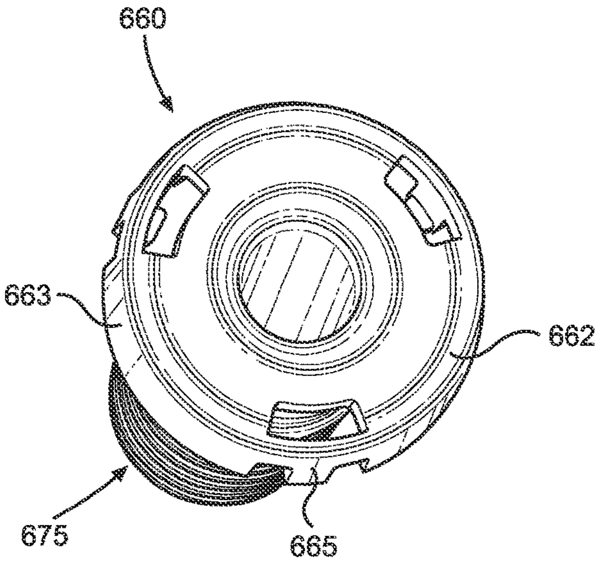
FIG. 22 illustrates a second isometric view of the mixing pin of FIGS. 15-17 and 19.

The adapter body 601 may further include a first branch member 614 and a second branch member 616. The first port 602 may extend from the first branch member 614, and the first branch member 614 may connect the first port 602 to the mixing member 618. The second port 604 may extend from the second branch member 616, and the second branch member 616 may connect the second port 604 to the mixing member 618. The first branch member 614 may have a first branch channel 620 configured to receive the fluid flow from the first syringe 20 through the first connector channel 610, and the second branch member 616 may have a second branch channel 622 configured to receive the fluid flow from the second syringe 40 through the second connector channel 612. The first second branch channel 620 and the second branch channel 622 may be in communication with the upper portion of the mixing member 618. The first branch channel 620 and the second branch channel 622 may be angled relative to the longitudinal axis of the adapter body 601 and/or mixing pin 660 to converge the fluid flow from the first syringe 20 and the second syringe 40 into the mixing member 618. The angle of at least one of the first branch channel 620 and the second branch channel 622 may be greater than 90 degrees relative to the mixing member 618, adapter body 601 and/or mixing pin 160. As further illustrated, the angle of at least one of the first branch channel 620 and the second branch channel 622 may be about 120-160 degrees relative to the mixing member 618, adapter body 601 and/or mixing pin 160. However, other configurations may be applied in other applications, as discussed herein. The first branch channel 620 and the second branch channel 622 may be oriented offset of or not aligned with a central plane of the adapter body 601 (as indicated by central axis A as illustrated in FIG. 16). In some embodiments, the first branch channel 620 and the second branch channel 622 may have the same or substantially the same width or diameter (as illustrated in FIG. 15) for applications where the same flow rate is desired for the first substance and the second substance. In some embodiments (as illustrated in FIGS. 11 and 12), the first branch channel 620 and the second branch channel 622 may have a different width or diameter for applications where the differing flow rates are desired for the first substance and the second substance. For example (as further illustrated in FIGS. 11 and 12), the first branch channel 620 may have a larger width or diameter than the second branch channel 622. In some embodiments (as illustrated in FIGS. 2, 3 and 8), at least one or both of the first branch channel 620 and the second branch channel 622 may be formed with an open outer end, and the adapter 600 may include a plug 640 inserted into one or both of the branch members 614, 616 to seal the outer end of the respective branch channel 620, 622. In some embodiments (as illustrated in FIG. 11), at least one or both of the first branch channel 620 and the second branch channel 622 may have a closed outer end formed by the adapter body 601.

The plugs 640*a,b* may be removable, replaceable, interchangeable, and/or adjustable. The plugs 640*a,b* may facilitate manufacturing of the adapter body 601 by allowing the branch channels 620, 622 to be formed in the adapter body 601 through injection molding by insertion of a straight pin (not shown). The pin may be removed from the injector body 601 after formation through an opening, and the plugs 640 may be inserted to seal the opening in the branch channels 620, 622, as discussed above with reference to plug 140 as expressly incorporated herein. Replacing and/or adjusting plugs 640*a*, may alter the inlet volume of one or both of the first connector channel 610 and/or the second connector channel 612. For example, the plugs 640*a,b* may be replaced with similar plugs 640*a,b* having different lengths and/or geometries to at least partially occlude one or both of the first connector channel 610 and/or the second connector channel 612. In some embodiments, the plugs 640 may be adjusted by being pushed or translated into the branch channels 620, 622 to at least partially occlude the first connector channel 610 and/or the second connector channel 612. In some embodiments, the plugs 640 may have an adjustable length such as being telescopic to at least partially occlude the first connector channel 610 and/or the second connector channel 612. Altering the inlet volume with the plugs 640*a,b* may adjust the fluid mixing ration and/or reduce dead volume of fluid left inside of the adapter body 601. As illustrated in FIGS. 23-24, the plugs 640*a,b* may include an end cap 641 and a pin 642. The end cap 641 may be configured to attach to the branch channels 620, 622 to secure the plug 640*a,b*. The pin 642 may be configured to extend into at least one of the branch channels 620, 622. As further discussed with respect to plug 140 (the discussion of which is expressly incorporated herein), the pin 642 may be configured to occupy space in the branch channels 620, 622 to reduce the negative space. The plugs 640*a,b* may further include a groove 643 configured to receive a sealing member (not shown). The plugs 640*a,b* may be the same for each branch channels 620, 622 or different. For example, the plug 640*a,b* for one of the branch channels 620, 622 may include the pin 642, and the plug 640*a,b* for another of the branch channels 620, 622 may not include the pin 642.

The mixing member 618 may have a mixing chamber 624 configured to receive the mixing pin 660. The mixing pin 660 may be removably inserted into the mixing chamber 624, for example, to allow interchangeability of the mixing pins depending on the intended application and/or substance. The body 601 may have an opening 626 longitudinally aligned and in communication with the mixing chamber 624. The mixing pin 660 may be inserted through the opening 626 into the mixing chamber 624. The opening 626 may be on an upper portion of the body 601, between the first port 602 and the second port 604, and in communication with the upper portion of the mixing chamber 624. As further illustrated, the mixing pin 660 may include an end cap 662 and the body 601 may include a rim 628 configured to engage the end cap 662 when the mixing pin 660 is inserted into the mixing chamber 624. The rim 628 may be on a tubular member 629 extending upwardly from the mixing member 618 between the branch members 614, 616. The end cap 662 may have a sleeve portion 663 extending downwardly configured to receive or surround the rim 628 of the body 601. The sleeve portion 663 may include one or more flexible protrusions 665 configured to flex radially outwardly when receiving the rim 628 in the sleeve portion 663 and releasably engage the rim 628 to secure the mixing pin 660 in the mixing chamber 624 in a press-fit and/or snap-fit. The one or more flexible protrusions 665 may be cantilevered to the upper portion of the end cap 662. However, the mixing pin 660 may, additionally or alternatively, be releasably secured in the mixing chamber 624 by other types of snap-fit, press-fit, a threaded connection, and/or a bayonet connection.

Figure 25:
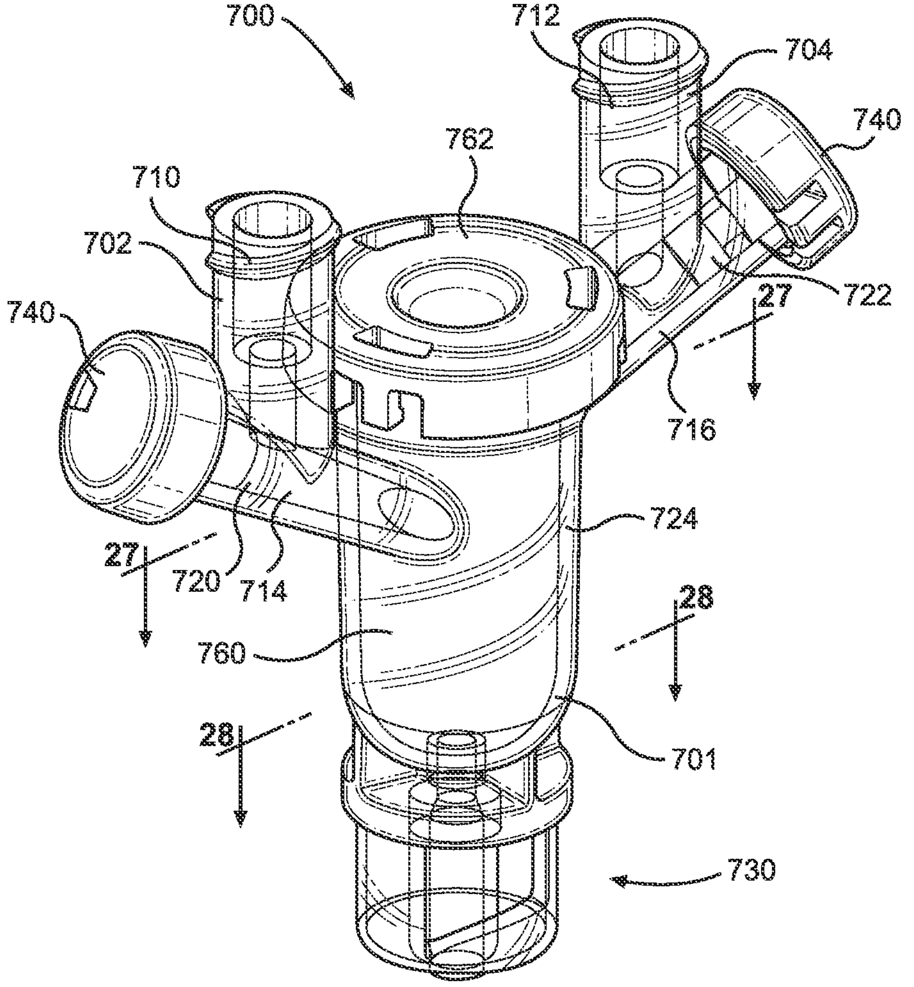
FIG. 25 illustrates an isometric view of a fourth embodiment of an adapter of the system of FIGS. 1-4.
Figure 26:
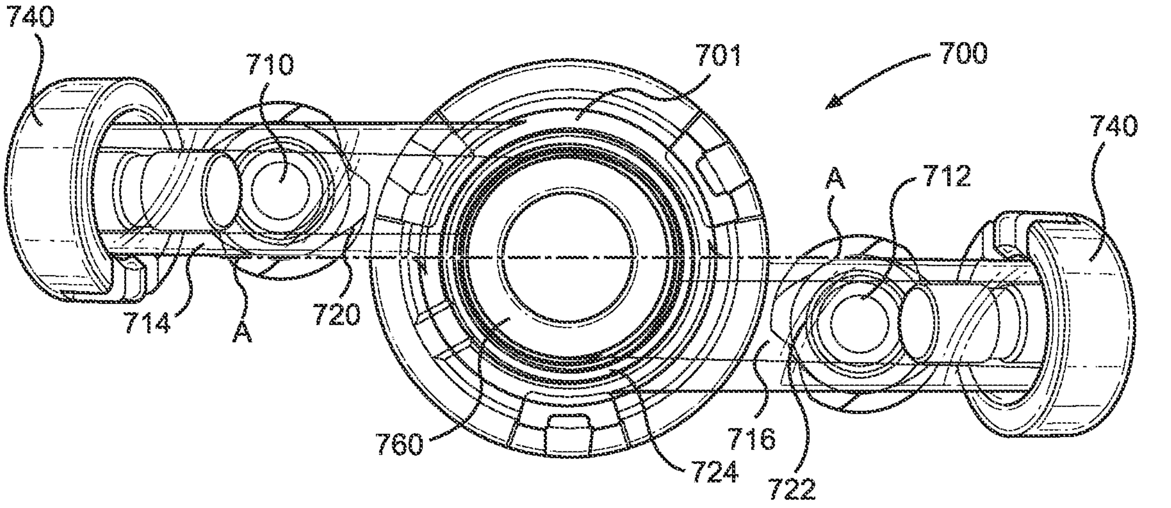
FIG. 26 illustrates a longitudinal view of the adapter of FIG. 25.
Figure 27:
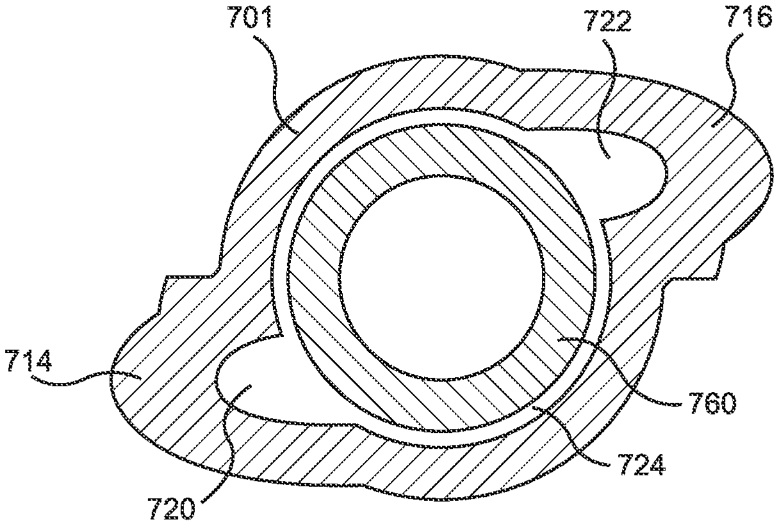
FIG. 27 illustrates a first cross-sectional view of the adapter of FIGS. 25-26.
Figure 28:
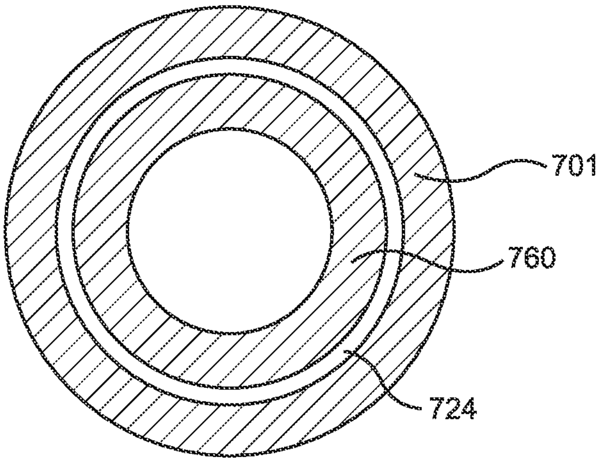
FIG. 28 illustrates a second cross-sectional view of the adapter of FIGS. 25-26.

The mixing pin 660 may have a relatively large diameter, such as greater than 8 mm. The diameter of the mixing pin 660 may provide design flexibility on the configuration of the first branch channel 620 and/or the second branch channel 620. As discussed above, the first branch channel 620 and/or the second branch channel 622 may be positioned or oriented offset of or not aligned with the lateral axis A (representing the central plane) of the adapter body 601 and/or the mixing pin 660 when inserted into the mixing chamber 624. The offset nature of the first branch channel 620 and/or the second branch channel 622 may generate angular momentum of the fluid flow around the mixing pin 660 and potential vortexes. In some embodiments (as illustrated in FIGS. 15-20), the first branch channel 620 and the second branch channel 622 may be positioned on the same side of the lateral axis A, such that the first substance and the second substance are introduced into the mixing chamber 624 in opposite directions and collide immediately. In some embodiments (as illustrated in FIGS. 25-26), the first branch channel 620 and the second branch channel 622 may be position on opposite sides of the lateral axis A of the body 601, such that the first substance and the second substance may flow in the same circumferential direction when introduced into the mixing chamber 624. In some embodiments (not shown), one of branch channels 620, 622 may be oriented aligned with the lateral axis A, and the other of the branch channels 620, 622 may be oriented offset or not aligned with the lateral axis A. In some embodiments (not shown), the branch channels 620, 622 may be connected to the adapter body 601 at different longitudinal positions. For example, the first branch channel 620 may be connected to the adapter body 601 at a position above or below the second branch channel 622.

At least one path may be defined at least partially around the mixing pin 660 for mixing the first flow of the first substance and the second flow of the second substance through turbulent flow. The mixing pin 660 may have a sealing portion 664 extending below the end cap 662. The sealing portion 664 may have a shape configured to seal the upper portion of the mixing chamber 624. The sealing portion 664 may have a width or diameter less than that of the end cap 662 and be received in the upper portion of the mixing chamber 624 below the end cap 662. The sealing portion 664 may be cylindrical. The mixing pin 660 may have a channel portion 667 below the sealing portion 664 and having a width or diameter less than the sealing portion 664. The channel 667 may, additionally or alternatively, receive a sealing member 695 being a separate component such as an elastomeric O-ring. The mixing pin 660 may further include a threaded outer portion 675 defining at least one helical channel 676. The threaded outer portion 675 may have a width or diameter greater than the channel 667, and the threaded outer portion 675 may extend a majority of the length of the mixing pin 660 (e.g., greater than half of the length and/or greater than two-thirds of the length).

Figure 7:
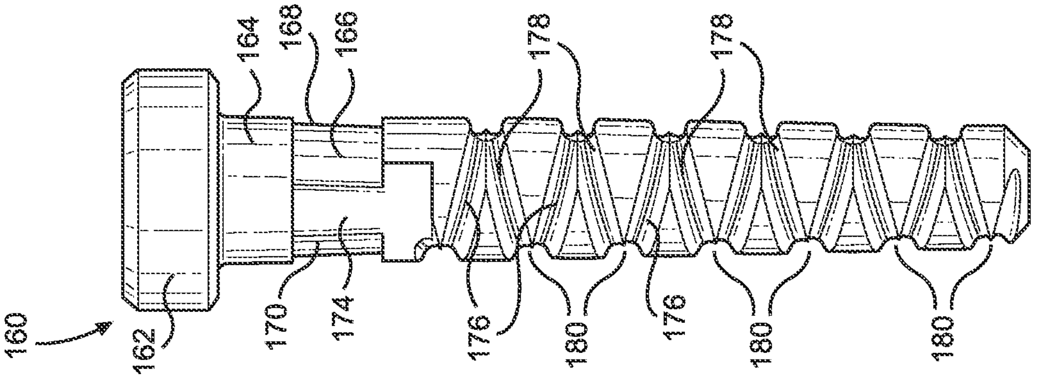
FIG. 7 illustrates a third side view of the mixing pin of the adapter of FIGS. 1-6.
Figure 6:
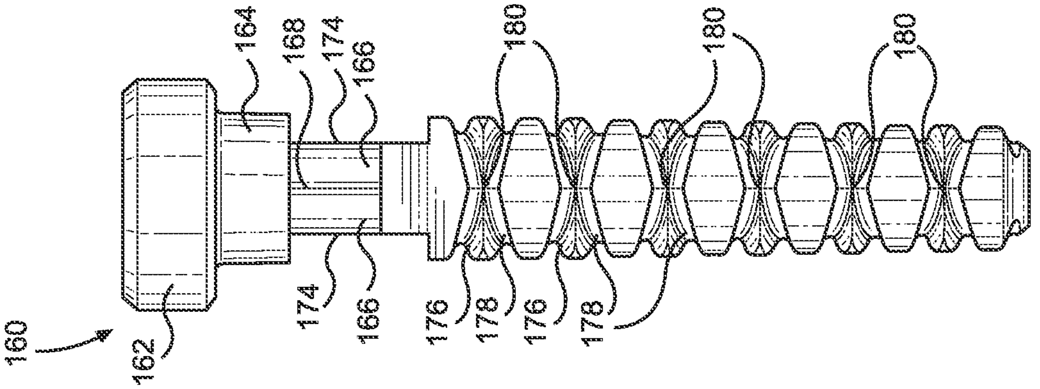
FIG. 6 illustrates a second side view of the mixing pin of the adapter of FIGS. 1-5.
Figure 5:
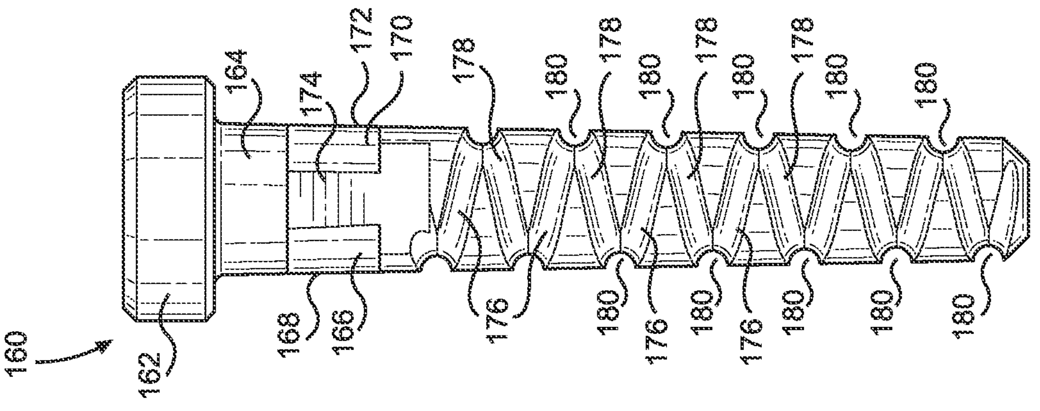
FIG. 5 illustrates a first side view of a mixing pin of the adapter of FIGS. 1-4.

As such, the geometry of the at least one helical channel 676 may be chosen depending on the degree of turbulence required to achieve the required amount of mixing for any given application of the adapter 600. For example, the pitch of the at least one helical channel 676 may be designed for the desired turbulence. The at least one helical channel 676 may have a reduced pitch for applications where a higher degree of turbulence is required to achieve desired mixing (for example where lipid nanostructures are to be formed). On the other hand, the at least one helical channel 676 may have a steeper pitch for applications where a low degree of turbulence is required to achieve desired mixing or where a lower flow volatility is required to maintain certain physical properties of the constituents during mixing. As such, the pitch of the at least one helical channel 676 may be chosen to provide a desired degree of mixing, while avoiding impractically high resistance for use with a manually driven syringe. In some embodiments, the at least one helical channel 676 may include a double helix, as discussed and illustrated with regard to the embodiment of FIGS. 5-7 as expressly incorporated herein by reference. The at least one helical channel 676 have a width of about 200 μm to about 1000 μm. In a preferred embodiment, the at least one helical channel 676 may have a width of about 400 μm to about 600 μm to facilitate manufacturing and optimize mixing and hydraulic pressure. Furthermore, the bottom of the at least one helical channel 676 may be spaced apart from the inner surface of the adapter body 601 by of about 200 μm to about 1000 μm. In a preferred embodiment, the bottom of the at least one helical channel 676 may be spaced apart from the inner surface of the adapter body 601 by about 400 μm to about 600 μm.

The body 601 may have a third port or connector member 630 at a bottom portion of the mixing member 618. The third port 630 may be a male Luer connector including a tip 632 and a sleeve 634 configured to attach to the recipient container 60 via the vial adapter 70. The tip 632 may have the tip channel 625 in communication with a second or bottom portion of the mixing chamber 624. The tip 632 may be received in the connector 74 of the vial adapter 70 and the sleeve 634 may be threadedly connected to an outer surface of the connector 74 in a Luer connection. The third port 630 may be a male Luer connector configured to connect to a female Luer connector of the vial adapter 70. However, the third port 630 may, additionally or alternatively, connect to the recipient container 60 with other types of connections such as a snap-fit and/or a press-fit. The tip lumen 625 may provide passage of the mixed composition from the mixing chamber 624 to the recipient container 60.

FIGS. 25-28 illustrate a fourth embodiment of an adapter 700 of the system 10 of FIGS. 1-4. As illustrated, the adapter 700 may include a body 701 having a first port or connector member 702 configured to attach to the syringe connector 26 of the first container 20 and a second port or connector member 704 configured to attach to the syringe connector 46 of the second container 40. The disclosure of the adapter 100, 500, 600 and/or the mixing pin 160, 260, 360, 460, 660 is expressly incorporated herein its entirety, unless otherwise indicated.

As illustrated, the adapter body 701 may further include a first branch member 714, a second branch member 716, and a mixing member 718. The first port 702 may extend from the first branch member 714, and the first branch member 714 may connect the first port 702 to the mixing member 718. The second port 704 may extend from the second branch member 716, and the second branch member 716 may connect the second port 704 to the mixing member 718. The first branch member 714 may have a first branch channel 720 configured to receive the fluid flow from the first syringe 20 through the first connector channel 710, and the second branch member 716 may have a second branch channel 722 configured to receive the fluid flow from the second syringe 40 through the second connector channel 712. The first second branch channel 720 and the second branch channel 722 may be in communication with the upper portion of the mixing member 718. The first branch channel 720 and the second branch channel 722 may be angled relative to the longitudinal axis of the adapter body 701 and/or mixing pin 760 to converge the fluid flow from the first syringe 20 and the second syringe 40 into the mixing member 718. As discussed above with reference to adapter 600, the first branch channel 720 and the second branch channel 722 may be oriented offset of or not aligned with a central plane of the adapter body 701 (as indicated by axis A in FIG. 26). In some embodiments, the first branch channel 720 and the second branch channel 722 may have the same or substantially the same width or diameter (as illustrated in FIG. 15) for applications where the same flow rate is desired for the first substance and the second substance. In some embodiments (as illustrated in FIGS. 11 and 12), the first branch channel 720 and the second branch channel 722 may have a different width or diameter for applications where the differing flow rates are desired for the first substance and the second substance. For example (as further illustrated in FIGS. 11 and 12), the first branch channel 720 may have a larger width or diameter than the second branch channel 722. In some embodiments (as illustrated in FIGS. 2, 3 and 8), at least one or both of the first branch channel 720 and the second branch channel 722 may be formed with an open outer end, and the adapter 700 may include a plug 740 inserted into one or both of the branch members 714, 716 to seal the outer end of the respective branch channel 720, 722. In some embodiments (as illustrated in FIG. 11), at least one or both of the first branch channel 720 and the second branch channel 722 may have a closed outer end formed by the adapter body 601.

The plugs 740*a,b* may be removable, replaceable, interchangeable, and/or adjustable. Replacing and/or adjusting plugs 740*a*, may alter the inlet volume of one or both of the first connector channel 710 and/or the second connector channel 712. For example, the plugs 740*a,b* may be replaced with similar plugs 740*a,b* having different lengths and/or geometries to at least partially occlude one or both of the first connector channel 710 and/or the second connector channel 712. In some embodiments, the plugs 740 may be adjusted by being pushed or translated into the branch channels 720, 722 to at least partially occlude the first connector channel 710 and/or the second connector channel 712. In some embodiments, the plugs 740 may have an adjustable length such as being telescopic to at least partially occlude the first connector channel 710 and/or the second connector channel 712. Altering the inlet volume with the plugs 740*a,b* may adjust the fluid mixing ration and/or reduce dead volume of fluid left inside of the adapter body 701. The discussion of the plugs 140, 640*a,b* is expressly incorporated herein by reference.

As further discussed and illustrated with respect to the adapter 600, the mixing member 718 may have a mixing chamber 724 configured to receive the mixing pin 760. The mixing pin 760 may be removably inserted into the mixing chamber 724, for example, to allow interchangeability of the mixing pins depending on the intended application and/or substance. The body 701 may have an opening longitudinally aligned and in communication with the mixing chamber 724. The mixing pin 760 may be inserted through the opening 726 into the mixing chamber 724. The opening may be on an upper portion of the body 701, between the first port 702 and the second port 704, and in communication with the upper portion of the mixing chamber 724. As further illustrated, the mixing pin 760 may include a flange cap 762 and the body 701 may include a rim configured to engage the flange cap 762 when the mixing pin 760 is inserted into the mixing chamber 724.

As discussed above, the first branch channel 720 and/or the second branch channel 722 may be oriented offset of the lateral axis A (representing the central plane) of the adapter body 701 and/or the mixing pin 760 when inserted into the mixing chamber 624. The offset nature of the first branch channel 720 and/or the second branch channel 722 may generate angular momentum of the fluid flow around the mixing pin 760 and potential vortexes. As illustrated in FIGS. 25 and 26, the first branch channel 720 and the second branch channel 722 may be position on opposite sides of the lateral axis A of the body 701, such that the first substance and the second substance may flow in the same circumferential direction when introduced into the mixing chamber 724. At least one path may be defined at least partially around the mixing pin 760 for mixing the first flow of the first substance and the second flow of the second substance through turbulent flow. As illustrated in FIG. 25, the mixing pin 760 may have an outer surface that may be smooth. A space may between the outer surface of the mixing pin 760 and an inner surface of the adapter body 701 may be 200 μm or less.

Figure 29:
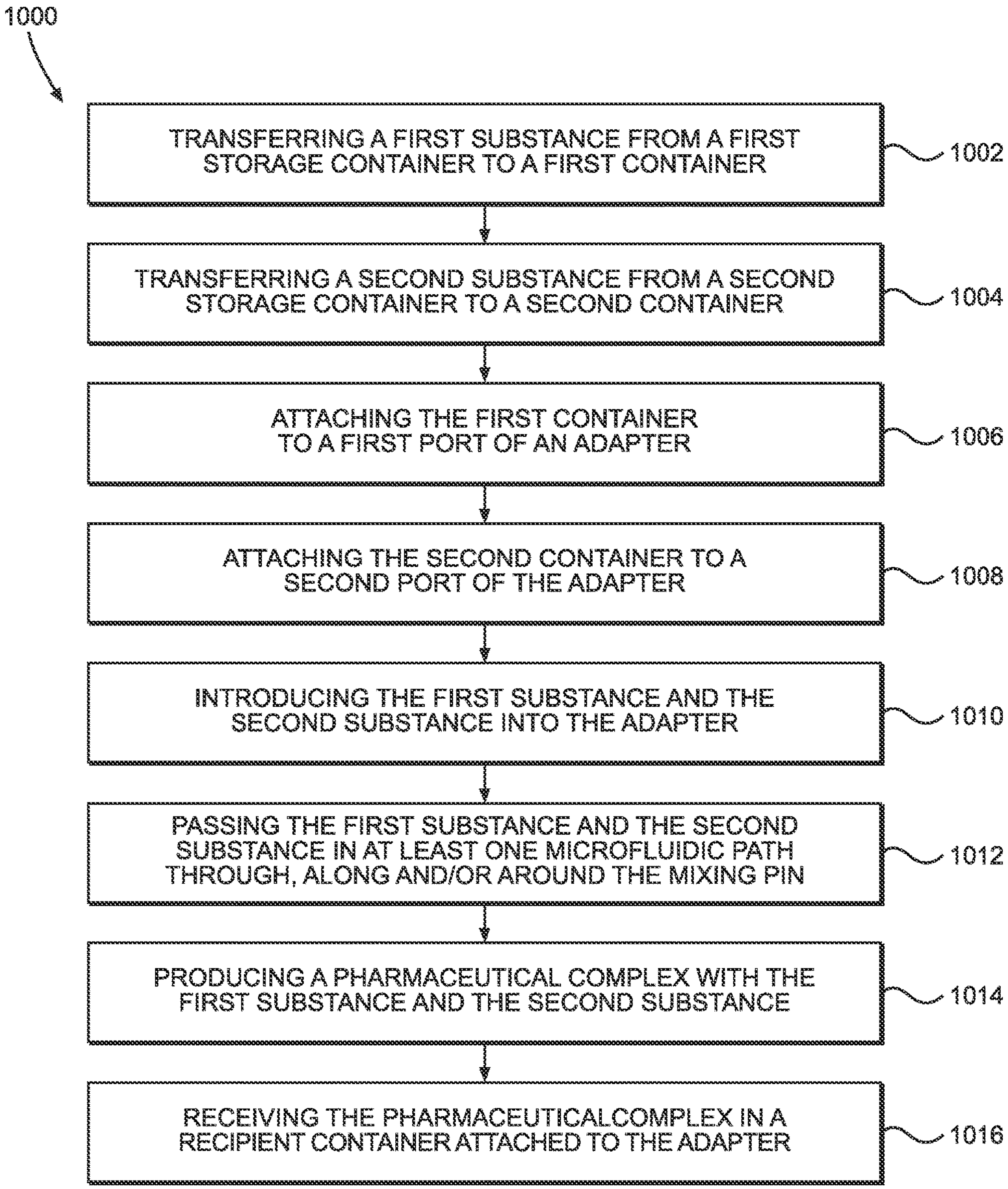
FIG. 29 illustrates a method of mixing a first substance and a second substance using one or more of the embodiments of FIGS. 1-28.

As illustrated in FIG. 29, this disclosure also includes a method 1000 of mixing at least two substances to generate a pharmaceutical complex via any one of the adapters 100, 500, 600, 700 and/or mixing pins 160, 260, 360, 460, 660, 760, as disclosed herein.

As indicated in steps 1002, 1004, the method may include transferring the first substance from the first storage container 80 to the first container 20 and transferring a second substance from the second storage container 82 to the second container 40. However, in some embodiments the first container 20 and/or the second container 40 may be packaged as prefilled containers, such as prefilled syringes, omitting the storage containers 80, 82 from the system or kit. As illustrated in steps 1006, 1008, the method may include attaching the first container 20 to the first port 102, 502, 602, 702 of the adapter 100, 500, 600, 700 and attaching the second container 40 to the second port 104, 504, 604, 704 of the adapter 100, 500, 600, 700. The method may further include attaching the recipient container 60 to the port 102, 502, 602, 702 of the adapter 100. For example, as illustrated, one or both of the first container 20 and the second container 40 may be a variable volume container, such as a syringe. The recipient container 60 may be fixed volume container, such as a vial attached to the adapter 100 with the vial adapter 70.

As indicated in step 1010, the method may further include introducing the first substance and the second substance into the adapter 100, 500, 600, 700 by depressing the plunger rod 24, 44 of each of the first container 20 and the second container 40. The first substance may pass through the first branch channel 120, 520, 620, 720 into the mixing chamber 124, 524, 624, and the second substance may pass through the second branch chamber 122, 522, 622, 722 into the mixing chamber 124, 524, 624. In some embodiments, the first branch channel 120, 520, 620, 720 and/or the second branch channel 122, 522, 622, 722 may be aligned with a lateral axis of the adapter body 101, 501, 601, 701. In some embodiments, at least one of the first branch channel 620, 720 and/or the second branch channel 622, 722 is oriented offset of the lateral axis of the adapter body 601, 701. In some embodiments, the first branch channel 620, 720 and the second branch channel 622, 722 are oriented offset of the lateral axis of the adapter body 601, 701. In some embodiments, the first branch channel 620, 720 and the second branch channel 622, 722 are on the same side of the lateral axis of the adapter body 601, 701. In some embodiments, the first branch channel 620, 720 and the second branch channel 622, 722 are on opposite sides of the lateral axis of the adapter body 601, 701.

Thus, initially, at the upper portion of the mixing chamber 124, 524, 624, 724 the first substance and the second substance are in a mutually unmixed state. Then, as indicated in step 1012, the first substance and the second substance may pass through, longitudinally along, and/or circumferentially around the mixing pin 160, 260, 360, 460, 660, 760 for example via one or more microfluidic channels, the first substance and the second substance may incrementally transition from the unmixed state to an increasingly mixed state. Turbulence induced in the fluid flow by the mixing chamber 124, 524, 624, 724 of the adapter results in the constituents being mixed as required upon reaching the lower portion of the mixing chamber 124, 524, 624, 724. In step 1014, mixing the first substance and the second substance may produce a pharmaceutical complex with the first substance and the second substance. In some embodiments, the first substance may be an aqueous solution, the second substance may be a lipid solution, and the pharmaceutical complex may include LNPs. For example, the aqueous solution may include mRNA, and the pharmaceutical complex may include mRNA-LNPs. In step 1016, the pharmaceutical complex may be received in the recipient container 60.

In some embodiments, the method further includes disconnecting the recipient container 60 from the connector member 130 and transferring the pharmaceutical complex from the recipient container 60 for dilution and/or further analysis. Alternatively, the method may further include disconnecting the recipient container 60 from the connector member 130 and using the pharmaceutical complex directly. In some embodiments, the first container and the second container are removably connected to the first port and the second port respectively, and the adapter may be reused. Alternatively, the first container and the second container may be permanently connected to the first port and the second port respectively. The adapter 100, 500, 600, 700 may be configured to enter a locked connection with one or more containers 20, 40 to prevent reuse of the adapter 100, 500, 600, 700. In some embodiments, the mixing pin 160, 260, 360, 460, 660, 760 may be removable from the adapter body 101, 601, 701. In some embodiments, the mixing pin 160, 260, 360, 460, 660, 760 may be fixed to the adapter body 101, 601, 701.

The mixing chamber 124, 524, 624, 724 may have a circular cross-section formed by a cylindrical inner surface of the adapter body 101, 601, 701. However, it is also contemplated that the mixing chamber 124, 524, 624, 724 may have other cross-sections, such as oval, square, and/or rectangular. The outer surface of the mixing pin 160, 260, 360, 460, 660, 760 may have an outer surface corresponding to the inner surface of mixing chamber 124, 524, 624, 724 to form the microfluidic channels or flow paths as discussed herein. The mixing pin 160, 260, 360, 460, 660, 760 may be solid to facilitate manufacturing, but could alternatively be hollow with a longitudinal lumen therethrough.

It will be understood that certain terminology is used in the preceding description for convenience and is not limiting. The terms "a", "an" and "the" should be read as meaning "at least one" unless otherwise specified. The term "comprising" will be understood to mean "including but not limited to" such that systems or method comprising a particular feature or step are not limited to only those features or steps listed but may also comprise features or steps not listed. Equally, terms such as "over", "under", "front", "back", "right", "left", "top", "bottom", "side" and so on are used for convenience in interpreting the drawings and are not to be construed as limiting.

It will also be appreciated by those skilled in the art that modifications can be made to the example embodiments described herein without departing from the invention. Structural features of systems and apparatuses described herein can be replaced with functionally equivalent parts or omitted entirely. Moreover, it will be appreciated that features from the embodiments can be combined with each other without departing from the disclosure.

What is claimed is:

1. An adapter comprising:

a body comprising:

- a first port configured to connect with a first container to receive a first substance,
- a first branch channel in communication with the first port,
- a second port configured to connect with a second container to receive a second substance,
- a second branch channel in communication with the second port,
- a third port configured to connect with a recipient container to output a mixture of the first substance and the second substance,
- a mixing chamber having a first portion in communication with the first branch channel and the second branch channel and a second portion in communication with the third port;

a first plug inserted into an end of the first branch channel;

a second plug inserted into an end of the second branch channel; and a mixing pin inserted into the mixing chamber, wherein the mixing pin at least partially defines at least one microfluidic path for mixing the first substance and the second substance.

2. The adapter of claim 1, wherein the body further comprises an opening in the first portion of the mixing chamber configured to receive the mixing pin.

3. The adapter of claim 1, wherein the mixing pin is removable from the mixing chamber.

4. The adapter of claim 1, wherein the mixing pin has a flange, and the body has a recess configured to receive the flange.

5. The adapter of claim 1, wherein the mixing pin includes a sealing portion configured to seal the first portion of the mixing chamber.

6. The adapter of claim 1, wherein the first port and/or the second port are substantially parallel to the mixing chamber.

7. The adapter of claim 1, wherein:

the first branch channel extends at a first angle relative to the mixing chamber, and the second branch channel extends at a second angle relative to the mixing chamber.

8. The adapter of claim 7, wherein the first angle and/or the second angle is greater than 90 degrees.

9. The adapter of claim 8, wherein the first angle and/or the second angle is about 120 to about 160 degrees.

10. The adapter of claim 1, wherein the first branch channel is configured to guide the first substance toward the mixing pin, and the second branch channel is configured to guide the second substance toward the mixing pin.

11. The adapter of claim 1, wherein the mixing pin defines a first edge surface formed by a first surface and a second surface and a second edge formed by a third surface and a fourth surface, the first edge is configured to divide the first substance, and the second edge is configured to divide the second substance.

12. The adapter of claim 1, wherein the first port is a female Luer connector, the second port is a female Luer connector, and the third port is a male Luer connector.

13. The adapter of claim 1, wherein the at least one microfluidic path is tortuous.

14. The adapter of claim 1, wherein the at least microfluidic path is formed by at least one channel.

15. The adapter of claim 14, wherein at least one channel has a dimension of about 200 μm to about 1000 μm.

16. The adapter of claim 15, wherein the at least one channel has a dimension of about 400 μm to about 600 μm.

17. The adapter of claim 14, wherein the at least one channel includes at least one helical channel.

18. The adapter of claim 17, wherein the at least one helical channel includes a first helical channel and a second helical channel, wherein the first helical channel and the second helical channel intersect along a longitudinal length of the mixing pin at a plurality of intersection points.

19. The adapter of claim 14, wherein the at least one channel extends through the mixing pin.

20. The adapter of claim 14, wherein the mixing pin includes a plurality of protrusions that extend at least partially around a circumference of the mixing pin and define at least a portion of the at least one channel.

21. The adapter of claim 20, wherein the plurality of protrusions extends uniformly around the circumference of the mixing pin and forms at least one radial gap with respect to an inner surface of the body, the at least one radial gap forming at least a portion of the at least one channel.

22. The adapter of claim 20, wherein each of the plurality of protrusions have at least one first surface configured to create a seal against an inner surface of the body and at least one second surface forming at least one radial gap with respect to the inner surface of the body, the at least one radial gap forming at least a portion of the at least one channel.

23. A system comprising:

a first container storing an aqueous solution;

a second container storing a lipid solution;

a recipient container; and the adapter of claim 1.

24. The adapter of claim 1, wherein the first plug is removable from the first branch channel.

25. The adapter of claim 1, wherein the second plug is removable from the second branch channel.

26. The system of claim 23, further comprising a second pin configured to be inserted into the mixing chamber, wherein the second mixing pin has a different geometry than the mixing pin.

27. A method for producing a pharmaceutical complex using the adapter of claim 1, the method comprising:

introducing the first substance into the first port;

introducing the second substance into the second port; and mixing the first substance and the second substance in the at least microfluidic path through, along, and/or around the mixing pin to produce the pharmaceutical complex.

28. The method of claim 27, wherein the first substance is an aqueous solution, the second substance is a lipid solution, and the pharmaceutical complex includes lipid nanoparticles.

* * * * *